(12) United States Patent
Kang

(10) Patent No.: US 9,081,477 B2
(45) Date of Patent: Jul. 14, 2015

(54) ELECTRONIC DEVICE AND METHOD OF CONTROLLING THE SAME

(75) Inventor: Minhun Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 980 days.

(21) Appl. No.: 13/112,923

(22) Filed: May 20, 2011

(65) Prior Publication Data

US 2011/0296339 A1    Dec. 1, 2011

(30) Foreign Application Priority Data

May 28, 2010  (KR) .................... 10-2010-0050004

(51) Int. Cl.
  *G06F 3/0481*  (2013.01)
  *G09G 5/14*  (2006.01)
  *G06F 3/0482*  (2013.01)
  *G06F 3/0488*  (2013.01)

(52) U.S. Cl.
  CPC .......... *G06F 3/04815* (2013.01); *G06F 3/0482* (2013.01); *G06F 3/04883* (2013.01); *G09G 5/14* (2013.01); *G06F 2203/04101* (2013.01); *G09G 2354/00* (2013.01); *G09G 2370/16* (2013.01); *G09G 2370/20* (2013.01)

(58) Field of Classification Search
  CPC ............... G06F 2203/04101; G06F 3/04815; G06F 3/04886; G06F 2203/04802; H04N 21/42204
  USPC ........................... 715/769, 782, 848–852, 863
  See application file for complete search history.

(56) References Cited

U.S. PATENT DOCUMENTS 5,678,015 A * 10/1997 Goh .............................. 715/782
5,880,733 A * 3/1999 Horvitz et al. ................. 715/850
6,597,358 B2 * 7/2003 Miller ............................ 345/427
6,675,190 B1 * 1/2004 Schabernack et al. ........ 718/102
6,710,788 B1 * 3/2004 Freach et al. .................. 715/778
6,922,815 B2 * 7/2005 Rosen ........................... 715/782
7,017,118 B1 * 3/2006 Carroll .......................... 715/770
8,132,120 B2 * 3/2012 Stallings et al. .............. 715/848
8,434,027 B2 * 4/2013 Jones ............................. 715/848
8,451,268 B1 * 5/2013 Reisman et al. .............. 345/419

(Continued)

FOREIGN PATENT DOCUMENTS

CN    101500328    8/2009

OTHER PUBLICATIONS

DLNA, "Digital Living Network Alliance", http://en.wikipedia.org/wiki/Digital_Living_Network_Alliance, Feb. 16, 2010, as evidenced by Internet Archive Wayback Machine.*

(Continued)

*Primary Examiner* — Andrew Tank
(74) *Attorney, Agent, or Firm* — Lee, Hong, Degerman, Kang & Waimey

(57) ABSTRACT

An electronic device having a display; a communication unit configured to communicate with a plurality of external electronic devices on a network; and a controller configured to cause displaying of a graphical user interface (GUI) on the display, the GUI having a plurality of areas, activate the GUI responsive to receiving a predetermined user input, identify a connection state of each of the plurality of external electronic devices having a connection to the electronic device, correspond each of the plurality of areas with a respective one of the plurality of external electronic devices, and cause displaying of content relating to each of the plurality of external electronic devices in their respective one of the plurality of areas.

10 Claims, 26 Drawing Sheets

(56) References Cited

U.S. PATENT DOCUMENTS

| | | | |
|---|---|---|---|
| 8,519,881 B2* | 8/2013 | Park et al. | 341/176 |
| 8,519,964 B2* | 8/2013 | Platzer et al. | 345/173 |
| 8,667,418 B2* | 3/2014 | Chaudhri et al. | 715/835 |
| 2003/0016253 A1* | 1/2003 | Aoki et al. | 345/863 |
| 2004/0135820 A1* | 7/2004 | Deaton et al. | 345/848 |
| 2005/0097478 A1* | 5/2005 | Killian et al. | 715/851 |
| 2006/0259864 A1* | 11/2006 | Klein et al. | 715/738 |
| 2007/0124474 A1 | 5/2007 | Margulis | |
| 2008/0311894 A1 | 12/2008 | Klein et al. | |
| 2009/0037971 A1* | 2/2009 | Lim | 725/131 |
| 2009/0177971 A1* | 7/2009 | Kim et al. | 715/739 |
| 2009/0256780 A1* | 10/2009 | Small et al. | 345/55 |
| 2010/0299638 A1* | 11/2010 | Choi | 715/835 |
| 2010/0305722 A1* | 12/2010 | Jin et al. | 700/90 |
| 2011/0179368 A1* | 7/2011 | King et al. | 715/769 |
| 2011/0231790 A1* | 9/2011 | Forstall et al. | 715/779 |
| 2011/0307834 A1* | 12/2011 | Wu | 715/836 |

OTHER PUBLICATIONS

Norman P. Coleman, "Combat Decision Aid Software (CDAS) for Network Centric Warfare/Effects Based Fires", 2004, pp. 1-20.

State Intellectual Property Office of the People's Republic of China Application Serial No. 201110147867.6, Office Action dated Feb. 1, 2013, 6 pages.

* cited by examiner

ELECTRONIC DEVICE AND METHOD OF CONTROLLING THE SAME

CROSS-REFERENCE TO RELATED APPLICATIONS

Pursuant to 35 U.S.C. §119(a), this application claims the benefit of earlier filing date and right of priority to Korean Application No. 10-2010-0050004 filed on May 28, 2010, the contents of which are hereby incorporated by reference herein in their entirety.

TECHNICAL FIELD

The present disclosure relates to an electronic device and, in particular, to a system and method of controlling a plurality of external electronic devices on a network using the electronic device.

DISCUSSION OF THE RELATED ART

With recent developments in hardware and software technology and the convergence between networks, various kinds of communication are enabled between electronic devices, and the range of applications is greatly increasing.

Conventional electronic devices provide user interfaces (UIs) for controlling local and external electronic devices. However, the conventional user interface requires a considerable amount of manipulation or navigation by a user. A more user-friendly user interface for an electronic device to communicate with an external electronic device is desirable.

Other conventional electronic devices are limited in hardware and software to provide content to an external electronic device. A method to efficiently control an electronic device to allow a user to enjoy a variety of content at the same time by a plurality of external electronic devices (e.g., 3-screen play, 5-screen play, etc.) is desirable.

Moreover, the other conventional electronic devices require a considerable amount of control for transferring information from an electronic device to another electronic device. Enabling a more efficient transfer of information during the transmission and reception of information among a plurality of external electronic devices is desirable.

SUMMARY

In one embodiment, an electronic device having a display; a communication unit configured to communicate with a plurality of external electronic devices on a network; and a controller configured to cause displaying of a graphical user interface (GUI) on the display, the GUI having a plurality of areas, activate the GUI responsive to receiving a predetermined user input, identify a connection state of each of the plurality of external electronic devices having a connection to the electronic device, correspond each of the plurality of areas with a respective one of the plurality of external electronic devices, and cause displaying of content relating to each of the plurality of external electronic devices in their respective one of the plurality of areas.

In another embodiment, a method of controlling an electronic device, the method having the steps of communicating with a plurality of electronic devices on a network via a communication unit of a first electronic device of the plurality of electronic devices; displaying a graphical user interface (GUI) on a display of the first electronic device, the GUI comprising a plurality of areas; activating the GUI responsive to receiving a predetermined user input; identifying a connection state of each of the plurality of electronic devices having a connection to the first electronic device; correspond each of the plurality of areas with a respective one of the plurality of electronic devices; and displaying content relating to each of the plurality of electronic devices in their respective one of the plurality of areas.

In still another embodiment, a method of controlling an electronic device, the method having the steps of receiving first and second touch inputs relative to a display of an electronic device; displaying a three-dimensional (3D) graphical user interface (GUI); activating the displayed 3D GUI responsive to receiving the first and second touch inputs within a defined time period; enlarging the displayed 3D GUI after receiving the second touch input within the defined time period; receiving a stroke input proximate to the enlarged 3D GUI for rotating the enlarged 3D GUI; and rotating the enlarged 3D GUI in a direction which generally corresponds to a direction of the stroke input.

In a further embodiment, a method of controlling an electronic device, the method having the steps of displaying a graphical user interface (GUI) via a display of a mobile terminal; receiving a touch input proximate to a first area of the GUI, wherein the first area corresponds to a first electronic device having a connection with the mobile terminal; selecting the first area responsive to receiving a particular touch input; switching settings between the first area and a second area of the GUI responsive to receiving a drag input that extends from the selected first area toward the second area on the display, wherein switching the settings has the steps of changing a setting of the first external electronic device to change a correspondence from the first area to the second area, and changing a setting of a second external electronic device to change a correspondence from the second area to the first area.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present invention. In the drawings.

DETAILED DESCRIPTION

Figure 1:
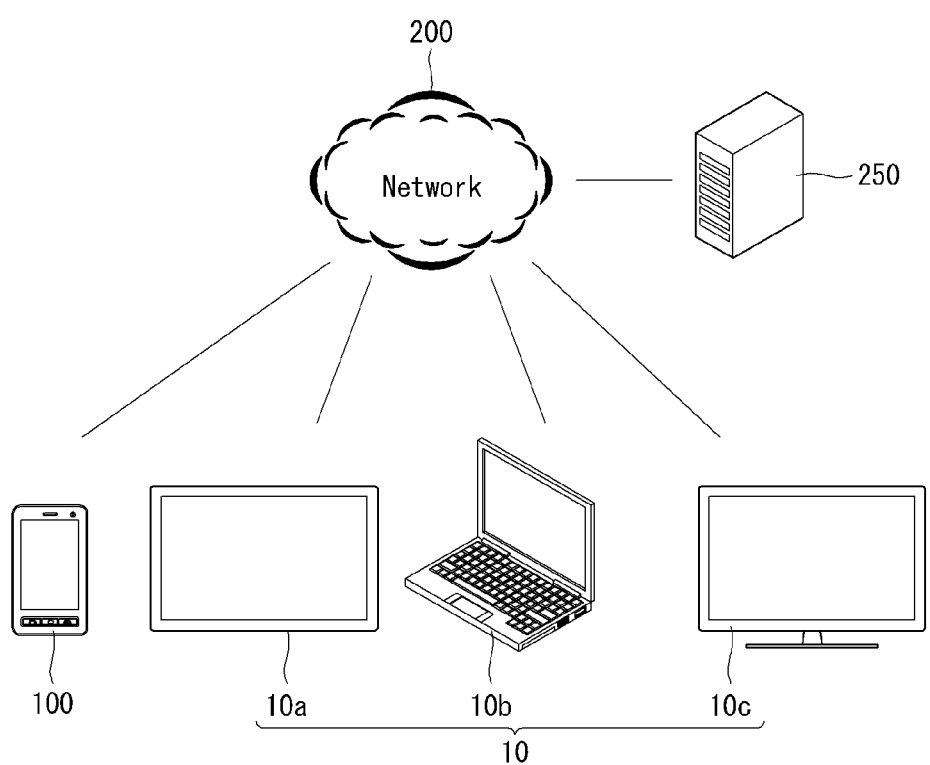
FIG. 1 is a schematic diagram illustrating a system of electronic devices according to an embodiment of the present invention.

The above and other aspects, features and advantages of the present disclosure will be more apparent from the following detailed description taken in conjunction with the accompanying drawings. Hereinafter, an implementation of this document will be described in detail with reference to the attached drawings. Like reference numerals refer to like elements throughout the specification. In describing the present disclosure, detailed descriptions of well-known functions or configurations will be omitted in order to not necessarily obscure the subject matter of the present disclosure.

The suffixes 'module', 'unit' and 'part' may be used for elements in order to facilitate the disclosure herein. Significant meanings or roles may not be given to the suffixes themselves and it is understood that the 'module', 'unit' and 'part' may be used together or interchangeably.

Figure 2:
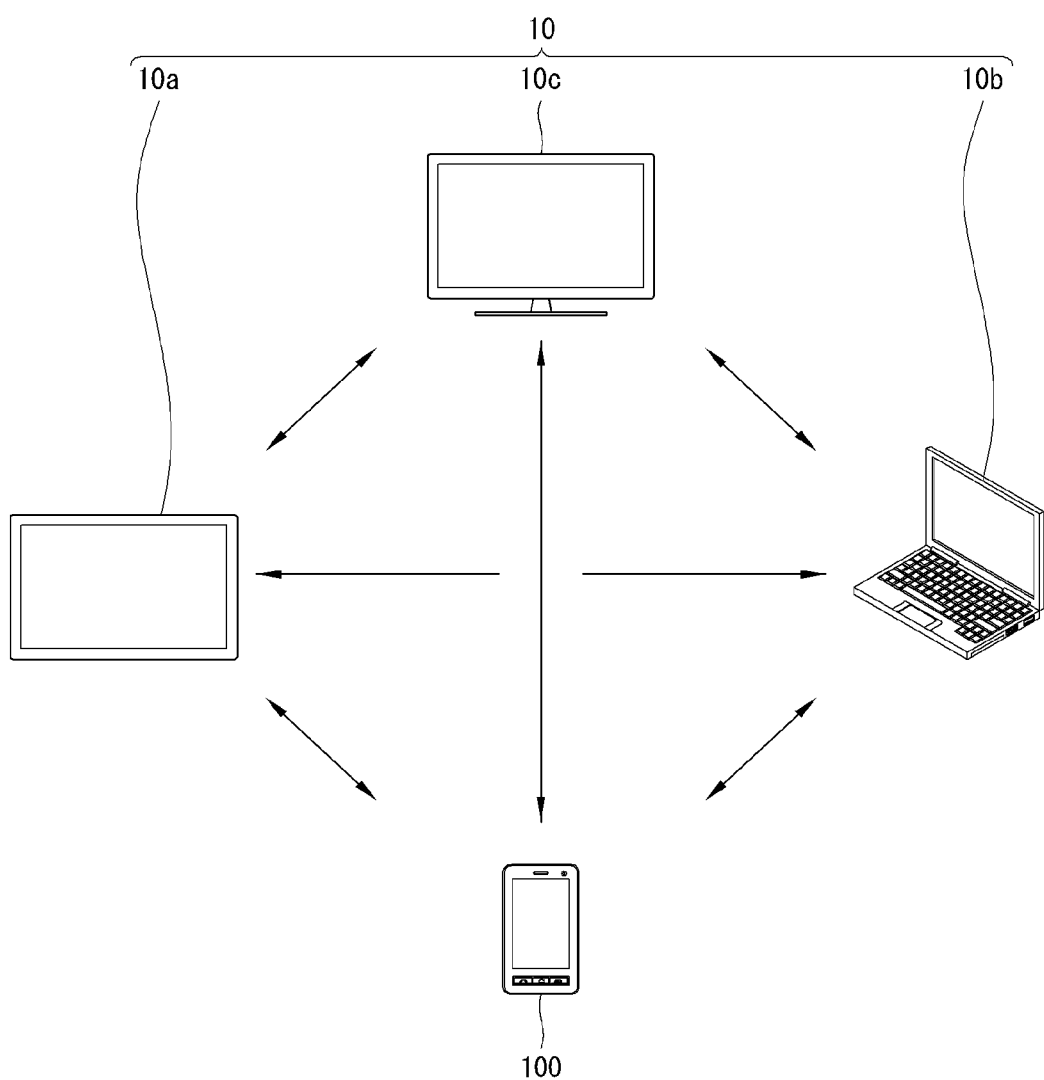
FIG. 2 is another schematic diagram illustrating the system of electronic devices according to an embodiment of the present invention.

FIG. 1 is a schematic diagram illustrating a system of electronic devices according to an embodiment of the present disclosure. FIG. 2 is another schematic diagram illustrating the system of electronic devices according to an embodiment of the present disclosure. Referring to FIGS. 1 and 2, a system environment 600 includes the mobile terminal 100, a plurality of external electronic devices 10, a network 200, and a server 250 connected to the network 200.

Referring to FIG. 1, the mobile terminal 100 and the plurality of external electronic devices 10 can each communicate with the network 200. For example, the mobile terminal 100 and the plurality of external electronic devices 10 can receive multimedia content from the server 250.

The network 200 may include at least a mobile communications network, wired or wireless Internet, or a broadcast network.

The plurality of external electronic devices 10 may include at least stationary or mobile terminals. For example, the plurality of external electronic devices 10 may include handheld phones, smart phones, computers, laptop computers, personal digital assistants (PDAs), portable multimedia players (PMPs), personal navigation devices, or mobile internet devices (MIDs).

Referring to FIG. 2, the plurality of external electronic devices 100 and 10 may communicate with each other by wireless or wired communication. The mobile terminal 100 can be a handheld phone or mobile phone. The plurality of external electronic devices 10 may include at least a first external electronic device 10a (e.g., a mobile terminal), a second external electronic device 10b (e.g., a computer), or a third external electronic device 10c (e.g., a television).

The method of communication between the mobile terminal 100 and the plurality of external electronic devices 10 is not limited. Existing and future methods of wireless communications between electronic devices are applicable.

For example, the mobile terminal 100 and the plurality of external electronic devices 10 can communicate with each other by a communication methods, such as Universal Plug and Play (UPnP), Digital Living Network Alliance (DLNA), or Wireless Fidelity (WiFi). Moreover, the mobile terminal 100 and the plurality of external electronic devices 10 can communicate with each other via the network 200 or a short-range communication method.

Figure 3:
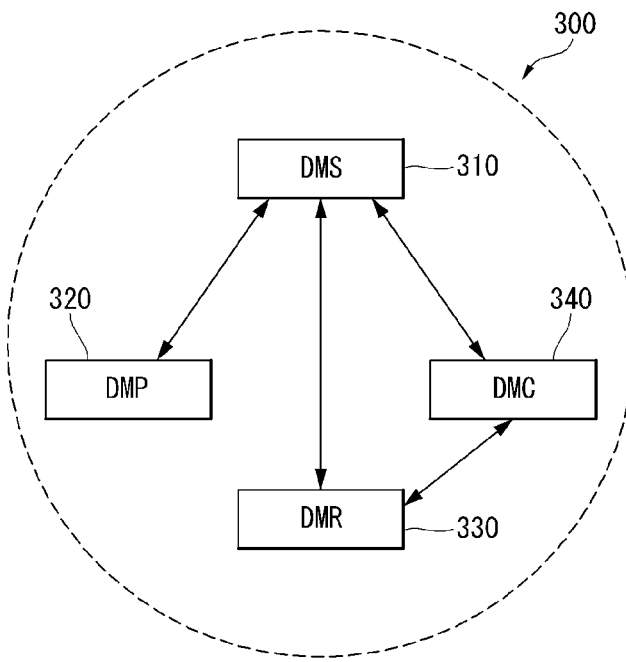
FIG. 3 is a conceptual diagram illustrating a Digital Living Network Alliance (DLNA) network according to an embodiment of the present invention.

FIG. 3 is a conceptual diagram illustrating a Digital Living Network Alliance (DLNA) network according to an embodiment of the present disclosure. The DLNA is an organization that creates standards for sharing content, such as music, video, or still images between electronic devices over a network. The DLNA is based on the Universal Plug and Play (UPnP) protocol.

The DLNA network 300 may comprise a digital media server (DMS) 310, a digital media player (DMP) 320, a digital media render (DMR) 330, and a digital media controller (DMC) 340.

The DLNA network 300 may include at least the DMS 310, DMP 320, DMR 330, or DMC 340. The DLNA may provide a standard for compatibility between each of the devices. Moreover, the DLNA network 300 may provide a standard for compatibility between the DMS 310, the DMP 320, the DMR 330, and the DMC 340.

The DMS 310 can provide digital media content. That is, the DMS 310 is able to store and manage the digital media content. The DMS 310 can receive various commands from the DMC 340 and perform the received commands. For example, upon receiving a play command, the DMS 310 can search for content to be played back and provide the content to the DMR 330. The DMS 310 may comprise a personal computer (PC), a personal video recorder (PVR), and a set-top box, for example.

The DMP 320 can control either content or electronic devices, and can play back the content. That is, the DMP 320 is able to perform the function of the DMR 330 for content playback and the function of the DMC 340 for control of other electronic devices. The DMP 320 may comprise a television (TV), a digital TV (DTV), and a home sound theater, for example.

The DMR 330 can play back the content received from the DMS 310. The DMR 330 may comprise a digital photo frame.

The DMC 340 may provide a control function for controlling the DMS 310, the DMP 320, and the DMR 330. The DMC 340 may comprise a handheld phone and a PDA, for example.

In some embodiments, the DLNA network 300 may comprise the DMS 310, the DMR 330, and the DMC 340. In other embodiments, the DLNA network 300 may comprise the DMP 320 and the DMR 330.

In addition, the DMS 310, the DMP 320, the DMR 330, and the DMC 340 may serve to functionally discriminate the electronic devices from each other. For example, if a handheld phone has a playback function as well as a control function, the handheld phone may be the DMP 320. Alternatively, the DTV may be configured to manage content and, therefore, the DTV may serve as the DMS 310 as well as the DMP 320.

In some embodiments, the mobile terminal 100 and the plurality of external electronic devices 10 may constitute the DLNA network 300 while performing the function corresponding to at least the DMS 310, the DMP 320, the DMR 330, or the DMC 340.

Figure 4:
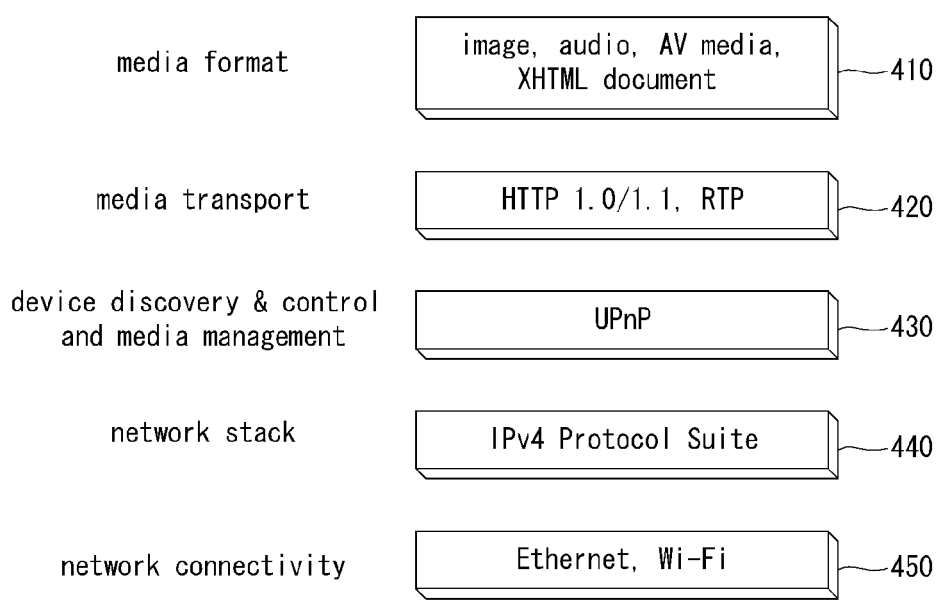
FIG. 4 is a block diagram illustrating functional components of the DLNA network.

FIG. 4 is a block diagram illustrating functional components of the DLNA network. The functional components of the DLNA may comprise a media format layer 410, a media transport layer 420, a device discovery & control and media management layer 430, a network stack layer 440, and a network connectivity layer 450.

The media format layer 410 may use images, audio, audio-video (AV) media, and Extensible Hypertext Markup Language (XHTML) documents.

The media transport layer 420 may use a Hypertext Transfer Protocol (HTTP) 1.0/1.1 networking protocol for streaming playback over a network. Alternatively, the media transport layer 420 may use a real-time transport protocol (RTP) networking protocol.

The device discovery & control and media management layer 430 may be directed to UPnP AV Architecture or UPnP Device Architecture. For example, a simple service discovery protocol (SSDP) may be used for device discovery on the network. Moreover, a simple object access protocol (SOAP) may be used for control.

The network stack layer 440 may use an Internet Protocol version 4 (IPv4) networking protocol. Alternatively, the network stack layer 440 may use an IPv6 networking protocol.

The network connectivity layer may comprise a physical layer and a link layer of the network. The network connectivity layer may further include at least Ethernet, WiFi, or Bluetooth®. Moreover, a communication medium capable of providing an IP connection may be used.

Figure 5:
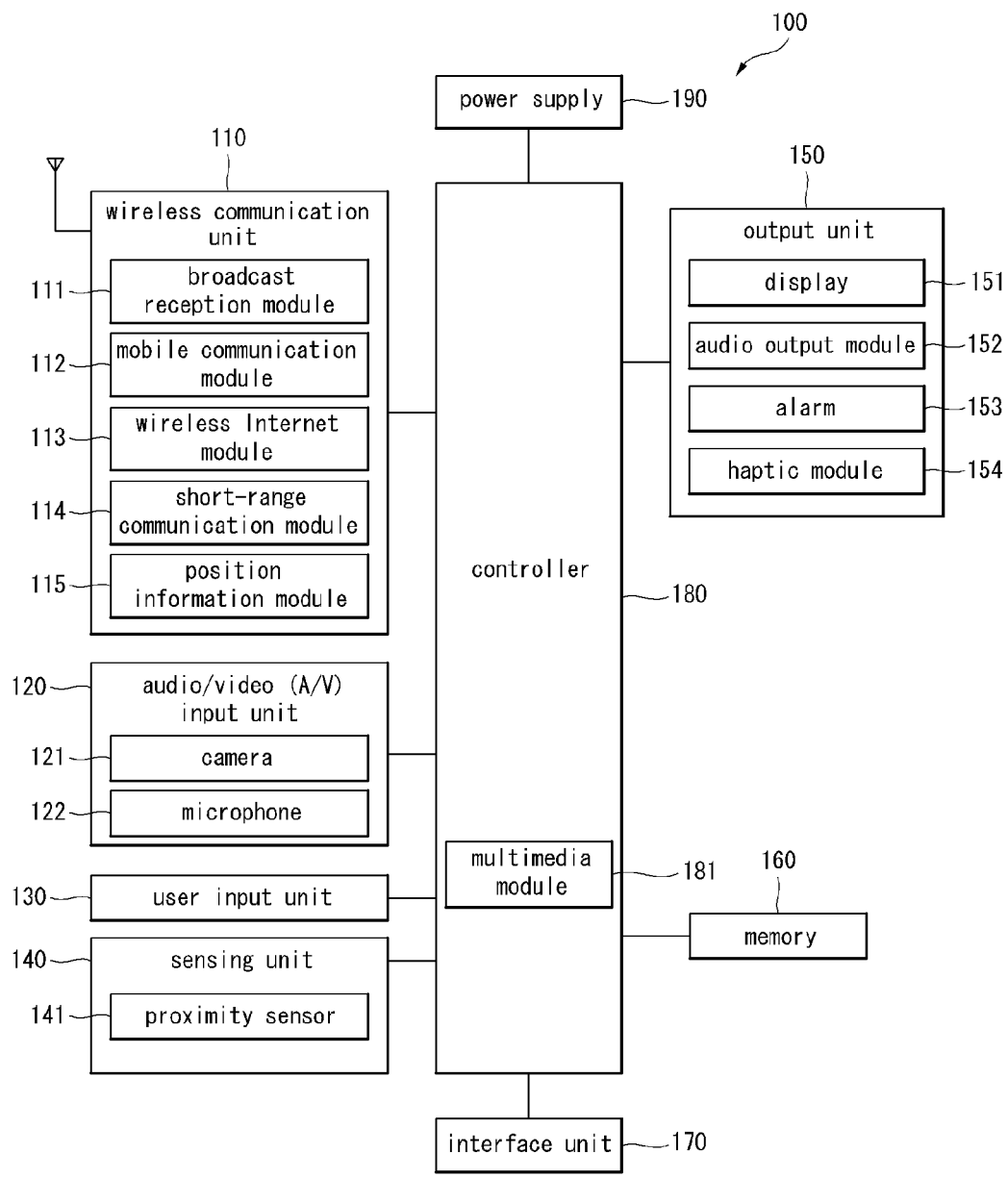
FIG. 5 is a block diagram of a mobile terminal according to an embodiment of the present invention.

FIG. 5 is a block diagram of a mobile terminal 100 according to an embodiment of the present disclosure. The mobile terminal 100 may refer to an electronic device among a plurality of external electronic devices on a network according to an embodiment of the present disclosure, which will be described in more detail with reference to the drawings.

Referring to FIG. 5, the mobile terminal 100 includes a wireless communication unit 110, an A/V (audio/video) input unit 120, a user input unit 130, a sensing unit 140, an output unit 150, a memory 160, an interface unit 170, a controller 180, and a power supply unit 190. FIG. 5 shows the mobile terminal 100 having various components, but it is understood that implementing all of the illustrated components is not required. Greater or fewer components may alternatively be implemented.

The wireless communication unit 110 can include one or more components that permit wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server (not shown) via a broadcast channel. The broadcast channel may include a satellite channel and a terrestrial channel.

The broadcast managing server generally refers to a server which generates and transmits the generated broadcast signal and/or broadcast associated information or a server which is provided with a previously generated broadcast signal and/or broadcast associated information and then transmits the provided broadcast signal or information to the mobile terminal 100. The transmitted broadcast signal may be implemented as a television (TV) broadcast signal, a radio broadcast signal, and a data broadcast signal. The transmitted broadcast signal may be combined with a TV or radio broadcast signal.

The broadcast associated information can include information associated with a broadcast channel, a broadcast program, and a broadcast service provider. The broadcast associated information can be provided via a mobile communication network, and be received by the mobile communication module 112 via a broadcast signal antenna 116.

The broadcast associated information can be implemented in various forms. For example, broadcast associated information may include an electronic program guide (EPG) related to digital multimedia broadcasting (DMB) and electronic service guide (ESG) related to digital video broadcast-handheld (DVB-H).

The broadcast receiving module 111 may be configured to receive broadcast signals transmitted from various types of broadcasting systems. The broadcasting systems can include digital multimedia broadcasting-terrestrial (DMB-T), digital multimedia broadcasting-satellite (DMB-S), digital video broadcast-handheld (DVB-H), media forward link only (MediaFLO®) and integrated services digital broadcast-terrestrial (ISDB-T). Greater or fewer broadcasting systems can be received by the broadcast receiving module 111.

The broadcast signal and/or broadcast associated information received by the broadcast receiving module 111 may be stored in a storage device, such as the memory 160.

The mobile communication module 112 transmits and receives wireless signals between one or more network entities (e.g., base station, external terminal, and server) via the broadcast signal antenna 116. The transmitted and received wireless signals may represent audio, video, and data signals according to text or multimedia message transmissions.

The wireless Internet module 113 supports Internet access for the mobile terminal 100. The wireless Internet module 113 may be internally or externally coupled to the mobile terminal 100. In this case, the wireless Internet technology supported by the wireless Internet module 113 can include Wireless LAN (WLAN), Wireless Fidelity (Wi-Fi™), Wibro (Wireless broadband), World Interoperability for Microwave Access (WiMAX), and High Speed Downlink Packet Access (HSDPA).

The short-range communication module 114 facilitates relatively short-range communications. Suitable technologies for implementing the short-range communication module 114 can include radio frequency identification (RFID), infrared data association (IrDA), ultra-wideband (UWB), Bluetooth® and ZigBee®.

The position information module 115 is a module for identifying or otherwise obtaining a position of the mobile terminal. The position information module 115 can acquire position information using a global navigation satellite system (GNSS). Here, GNSS refers to radio navigation satellite systems that orbit the earth and transmit reference signals so that the location of certain types of radio navigation receivers on the earth's surface can be determined or approximated. GNSS includes a global positioning system (GPS) managed by the USA, Galileo managed by Europe, global orbiting navigational satellite system (GLONASS) managed by Russia, COMPASS managed by China, and quasi-zenith satellite system (QZSS) managed by Japan.

As one representative example of GNSS, the position information module 115 may be a GPS (Global Positioning System) module. The GPS module 115 can calculate information on distances between one point (object) and at least three satellites, information on the time when the distance information is measured, and use the obtained distance information to triangulate three-dimensional position information on the point (object) according to latitude, longitude and altitude at a predetermined time. Moreover, a method of calculating position and time information using three satellites and correcting the calculated position and time information using another satellite can also be used. In addition, the GPS module 115 continuously calculates the current position in real time and calculates velocity information using the position information.

The audio/video (A/V) input unit 120 can be configured to provide audio or video signal input to the mobile terminal 100. The A/V input unit 120 can include a camera 121, a microphone 122, a flash module 123 and a mirror module 124. The camera 121 can receive and process image frames of still pictures (e.g., photographs) obtained by an image sensor when the mobile terminal 100 is in a photographing mode, and alternatively, receive and process moving picture data (e.g., video) when the mobile terminal 100 is in a video call mode. The processed image frames can be displayed by the output unit 150, such as a display 151.

The image frames processed by the camera 121 can be stored in the memory 160 or can be externally transmitted via the wireless communication unit 110. At least two cameras 121 can be provided in the mobile terminal 100 depending on the usage environment.

The microphone 122 receives an external audio signal while the mobile terminal 100 is in a particular mode, such as a phone call mode, a recording mode and a voice recognition mode. The external audio signal is processed and converted into digital audio data. The digital audio data is transformed into a format transmittable to a mobile communication base station via the mobile communication module 112 when the mobile terminal 100 is in a call mode. The microphone 122 can include assorted noise removing algorithms to remove noise generated when receiving the external audio signal. The flash module 123 can provide lighting in conjunction with the camera 121 obtaining images of the external environment. The mirror module 124 can provide a user with a reflective surface.

The user input unit 130 generates input data responsive to user manipulation of one or more associated input devices. Examples of such input devices can include a keypad, a dome switch, a touchpad (e.g., static pressure/capacitance), a jog wheel, and a jog switch.

The sensing unit 140 provides sensing signals for controlling operations of the mobile terminal 100 using status measurements of various aspects of the mobile terminal 100. For example, the sensing unit 140 may detect an open/close status of the mobile terminal 100, a relative positioning of components (e.g., a display and keypad) of the mobile terminal 100, a change of position of the mobile terminal 100 or a component of the mobile terminal 100, a presence or absence of user contact with the mobile terminal 100, or an orientation or acceleration/deceleration of the mobile terminal 100.

In another example, when the mobile terminal 100 is configured as a slide-type mobile terminal, the sensing unit 140 may sense whether a sliding portion of the mobile terminal 100 is open or closed. In another example, the sensing unit 140 can sense the presence or absence of power provided by the power supply unit 190, the presence or absence of a coupling or connection between the interface unit 170 and a device external to the mobile terminal 100. The sensing unit 140 can include a proximity sensor 141.

The output unit 150 generates outputs relevant to senses of sight, hearing, and touch. The output unit 150 can include the display 151, an audio output module 152, an alarm 153, a haptic module 154 and an earphone module 156.

The display 151 can be implemented to visually display or output information associated with the mobile terminal 100. For example, if the mobile terminal 100 is operating in a phone call mode, the display 151 can provide a user interface (UI) or graphical user interface (GUI) which includes information associated with placing, conducting, and terminating a phone call. In another example, if the mobile terminal 100 is in a video call mode or a photographing mode, the display 151 may additionally or alternatively display images which are associated with the photographing or video call modes, the UI or the GUI.

The display 151 may be implemented using one or more display technologies which include a liquid crystal display (LCD), a thin film transistor-liquid crystal display (TFT-LCD), an organic light-emitting diode display (OLED), a flexible display and a three-dimensional (3D) display. Moreover, a transparent display can be implemented using some of the foregoing display technologies in a transparent or optical transmittive type, such as a transparent OLED (TOLED).

A rear configuration of the display 151 can be implemented in the optical transmittive type as well. In this configuration, a user can see an object at a rear portion of the mobile terminal 100 via an area occupied by the display 151.

At least two display modules 151 can be provided in the mobile terminal 100. For example, a plurality of display modules 151 can be arranged on a single face of the mobile terminal 100 spaced apart from each other or built into one body. Alternatively, a plurality of display modules 151 can be arranged on different faces of the mobile terminal 100.

If the display 151 and the sensing unit 140 for detecting a touch action (hereinafter called "touch sensor") are configured as a mutual layer structure (hereinafter called "touchscreen"), the display 151 can be used as a user input unit 130 as well as an output unit 150. The touch sensor can be configured as a touch film, a touch sheet, or a touchpad.

The touch sensor can be configured to convert a pressure applied to a specific portion of the display 151 or a variation of a capacitance generated from a specific portion of the display 151 to an electric input signal. Accordingly, the touch sensor detects a pressure of a touch as well as a touched position or size.

If a touch input is made to the touch sensor, signal(s) corresponding to the touch input is transferred to a touch controller (not shown). The touch controller processes the signal(s) and then transfers the processed signal(s) to the controller 180. Therefore, the controller 180 can determine whether a prescribed portion of the display 151 has been touched.

The proximity sensor 141 can be provided to an internal area of the mobile terminal 100 enclosed by the display 151, such as the touchscreen or around the touchscreen. The proximity sensor 141 is a sensor that detects a presence of an object approaching a prescribed detecting surface or an object existing around the proximity sensor 141 using an electromagnetic field strength or infrared ray without mechanical contact. The proximity sensor 141 can be more durable and more useful than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, or an infrared proximity sensor. If the touchscreen includes the electrostatic capacity proximity sensor, the touchscreen is configured to detect the proximity of a pointer according to a variation in an electric field formed by the proximity of the pointer to the touchscreen. Accordingly, the touchscreen or touch sensor can be classified as the proximity sensor 141.

An action when a pointer approaches without contacting the touchscreen so the pointer is recognized as being located on the touchscreen is defined as "proximity touch." An action when a pointer actually touches the touchscreen is defined as "contact touch." The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, or a proximity touch shift state.). Information corresponding to the detected proximity touch action and the detected proximity touch pattern can be displayed on the touchscreen.

The audio output module 152 functions in various modes including a call-receiving mode, a call-placing mode, a recording mode, a voice recognition mode, and a broadcast reception mode in order to output audio data which is received from the wireless communication unit 110 or stored in the memory 160. During operation, the audio output module 152 outputs audio relating to a particular function (e.g., call received, message received). The audio output module 152 can be implemented individually or by using one or more speakers, buzzers, and other audio producing devices.

The alarm 153 outputs a signal for announcing an occurrence of a particular event associated with the mobile terminal 100. Examples of the announced events can include a call received event, a message received event and a touch input received event.

The alarm 153 can output a signal for announcing the event occurrence by way of vibration as well as via a video or audio signal. The video or audio signal can be output via the display 151 or the audio output module 152. Hence, the display 151 or the audio output module 152 can be regarded as a part of the alarm 153.

The haptic module 154 generates various tactile effects that can be sensed by a user. Vibration is a representative tactile effect generated by the haptic module 154. Strength and pattern of the vibration generated by the haptic module 154 can be controlled. For example, different vibrations can be output simultaneously or sequentially.

The haptic module 154 can generate various tactile effects as well as the vibration. For example, the haptic module 154 generates an effect attributed to the arrangement of pins vertically moving against a contact skin surface, an effect attributed to the injection/suction power of air though an injection/suction hole, an effect attributed to skimming over a skin surface, an effect attributed to the contact with an electrode, an effect attributed to electrostatic force, or an effect attributed to the representation of hold/cold sense using an endothermic or exothermic device.

The haptic module 154 can be implemented to enable a user to sense the tactile effect through a muscle sense of a finger or an arm as well as to transfer the tactile effect through direct contact. At least two haptic modules 154 can be provided in the mobile terminal 100.

Furthermore, the audio output module 152 can output sound through an earphone jack 156. The user can connect earphones to the earphone jack 156 and hear the output sound.

The memory 160 can be used to store various types of data to support processing, control, and storage requirements of the mobile terminal 100. Examples of such stored data include program instructions for applications operating on the mobile terminal 100, contact data, phonebook data, messages, audio, still pictures, and moving pictures. The memory 160 can also store a recent use history or a cumulative use frequency of each data (e.g., use frequency for each phonebook, each message or each multimedia). Moreover, data for various patterns of vibration and/or sound output can be stored in the memory 160 when a touch input to the touchscreen is sensed.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. Further, the mobile terminal 100 can operate via a web storage entity for performing a storage function of the memory 160 on the Internet.

The interface unit 170 can be implemented to couple the mobile terminal 100 with external devices. The interface unit 170 receives data from the external devices or is supplied with power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, and an earphone port.

The identity module (not shown) can be an integrated circuit for storing various types of information for authenticating a use authority of the mobile terminal 100 and can include a User Identify Module (UIM), Subscriber Identify Module (SIM), and Universal Subscriber Identity Module (USIM). A device having the identity module (hereinafter called "identity device") can be manufactured as a smart card. Therefore, the identity device can be connected to the mobile terminal 100 via a corresponding port.

When the mobile terminal 100 is connected to an external cradle, the interface unit 170 provides a passage for supplying power to the mobile terminal 100 from the external cradle or a passage for delivering various command signals input by a user via the external cradle, to the mobile terminal 100. Each of the delivered command signals input via the external cradle or the supplied power can signal that the mobile terminal 100 has been correctly loaded in the external cradle.

The controller 180 controls the overall operations of the mobile terminal 100. For example, the controller 180 controls and processes voice calls, data communications, and video calls.

The controller 180 may include a multimedia module 181 that provides multimedia playback. The multimedia module 181 may be configured as part of the controller 180, or implemented as a separate component. Moreover, the controller 180 can perform a pattern recognition process for recognizing characters of a written input and images of a picture drawing input carried out on the touchscreen.

The power supply unit 190 provides power required by the various components of the mobile terminal 100. The provided power may be provided internally or externally to the mobile terminal 100.

Various embodiments described herein may be implemented in a computer-readable medium using, for example, computer software, hardware, or some combination thereof. For a hardware implementation, the embodiments described herein may be implemented individually or combined within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. The foregoing embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 6A:
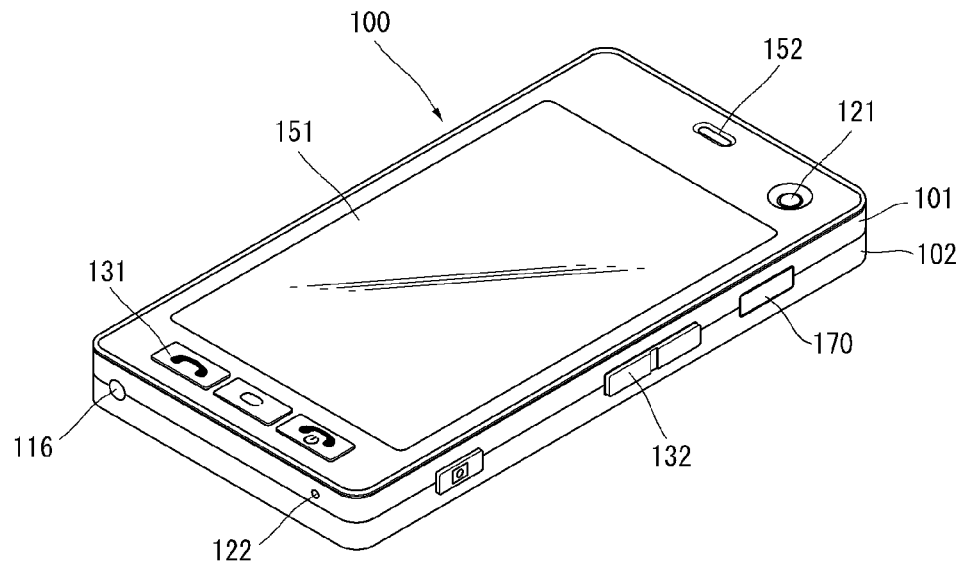
FIGS. 6A and 6B are perspective diagrams of the mobile terminal according to an embodiment of the present invention.

FIG. 6A is a perspective diagram of a front side of the mobile terminal 100 according to an embodiment of the present disclosure. The mobile terminal 100 is configured to have a bar-type terminal body. Yet, the mobile terminal 100 may be implemented in a variety of different configurations. Examples of such configurations include a folder-type, a slide-type, a rotational-type, a swing-type and combinations thereof. For clarity, the remainder of the disclosure will discuss the mobile terminal 100 directed to the bar-type terminal body. However such teachings apply equally to other types of mobile terminals.

Referring to FIG. 6A, the mobile terminal 100 includes a case (casing, housing, cover, etc.) configuring an exterior thereof. In the present embodiment, the case can be divided into a front case 101 and a rear case 102. Various electric or electronic parts are loaded in a space provided between the front case 101 and rear case 102. Optionally, at least one middle case can be additionally provided between the front case 101 and rear case 102.

The cases 101 and 102 can be formed by injection molding of synthetic resin or can be formed of metal substances such as stainless steel or titanium.

The front case 101 of the mobile terminal 100 can include at least the display 151, the audio output unit 152, a camera 121, user input units 131 and 132, the microphone 122, or the interface unit 170.

The display 151 occupies most of a main face of the front case 101. The audio output unit 151 and the camera 121 are provided on an area adjacent to one of two end portions of the display 151, while the user input unit 131 and the microphone 122 are provided to another area adjacent to the other end portion of the display 151. The user input unit 132 and the interface unit 170 can be provided on lateral sides of the front case 101 and rear case 102.

The input unit 130 is manipulated to receive a command for controlling an operation of the mobile terminal 100. The input unit 130 is able to include a plurality of manipulating units 131 and 132. The manipulating units 131 and 132 can be named a manipulating portion and may adopt any mechanism of a tactile manner that enables a user to perform a manipulation action by sensing a tactile feedback.

Content input by the first manipulating unit 131 or second manipulating unit 132 can be diversely set. For instance, commands such as start, end or scroll can be input to the first manipulating unit 131. On the other hand, commands directed to adjusting a volume of sound outputting from the audio output unit 152 or switching to a touch recognizing mode of the display 151 can be input to the second manipulating unit 132.

Figure 6B:
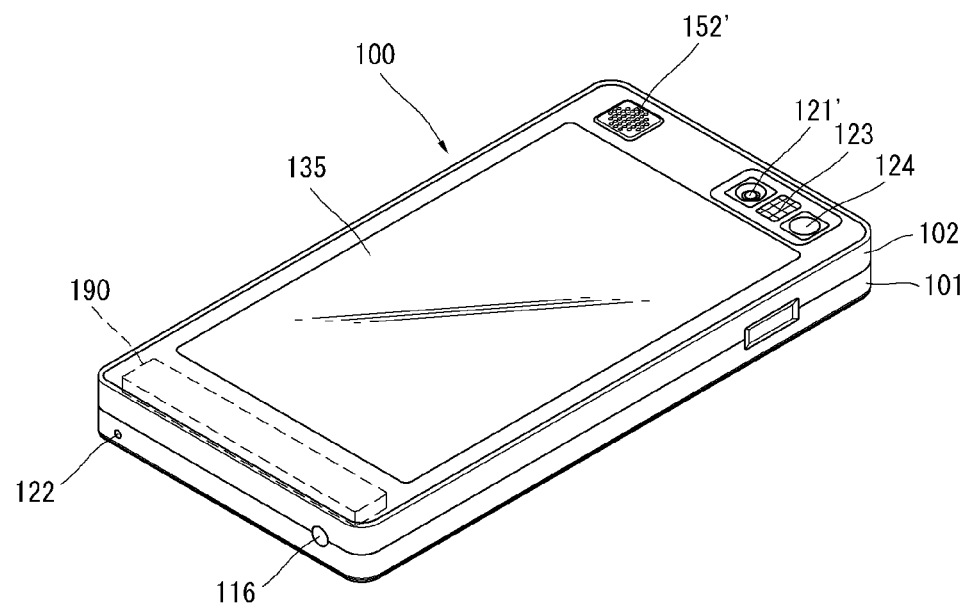

FIG. 6B is a perspective diagram of a backside of the mobile terminal 100 shown in FIG. 6A. Referring to FIG. 6B, a camera 121' can be additionally provided to a backside of the mobile terminal 100, and more particularly, to the rear case 102. The camera 121' has a photographing direction that is substantially opposite to that of the camera 121 shown in FIG. 6A and may have a different number of pixels to provide a different resolution from that of the camera 121.

Preferably the camera 121 can have enough resolution to capture and transmit a picture of a user's face for a video call, while the camera 121' has a higher resolution for capturing a general subject for photography without transmitting the captured subject. Each of the cameras 121 and 121' can be installed in the mobile terminal 100 to be rotated open or popped open.

The flash module 123 and the mirror module 124 are additionally provided adjacent to the camera 121'. The flash module 123 projects light toward a subject in case of photographing the subject using the camera 121'. In case that a user attempts to take a picture of the user (e.g., self-photography) using the camera 121', the mirror module 124 enables the user to view user's face reflected by the mirror module 124.

An additional audio output unit 152' can be provided to the backside of the mobile terminal 100. The additional audio output unit 152' is able to implement a stereo function together with the audio output unit 152 shown in FIG. 6A and may be used to implement a speakerphone mode when the mobile terminal 100 is configured in the phone call mode.

The broadcast signal antenna 116 can be provided to the lateral side of the mobile terminal 100 to provide further communication capabilities to the mobile terminal 100. The broadcast signal antenna 116 can be constructed as a portion of the broadcast receiving module 111 shown in FIG. 6B. Additionally, the broadcast signal antenna 116 can be configured to be retractable in the mobile terminal 100.

The power supply unit 190 for supplying power to the mobile terminal 100 can be configured to be built within the mobile terminal 100. Alternatively, the power supply unit 190 can be configured to be detachably connected to the mobile terminal 100.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Figure 7A:
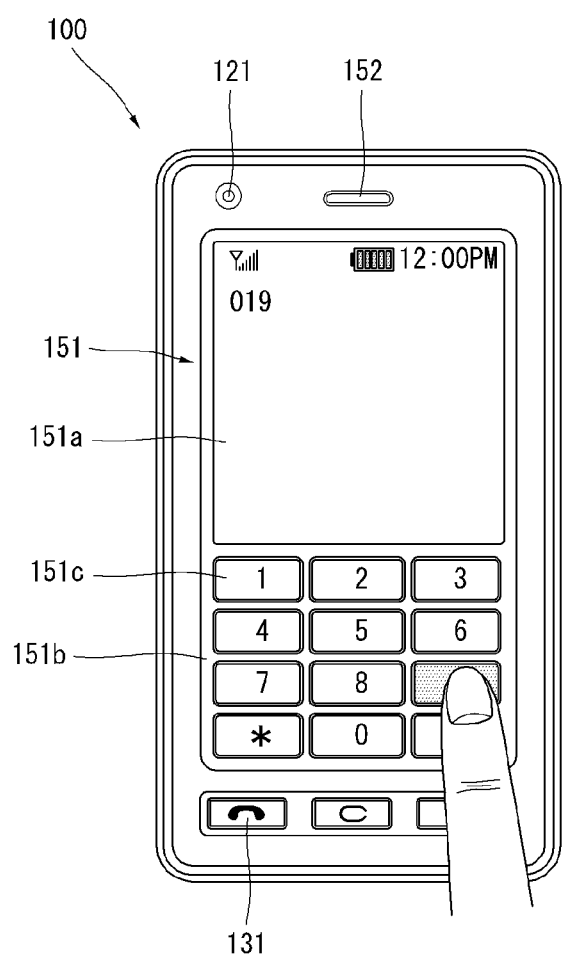
FIG. 7A is a view illustrating a first operational mode of the mobile terminal according to an embodiment of the present invention.
Figure 7B:
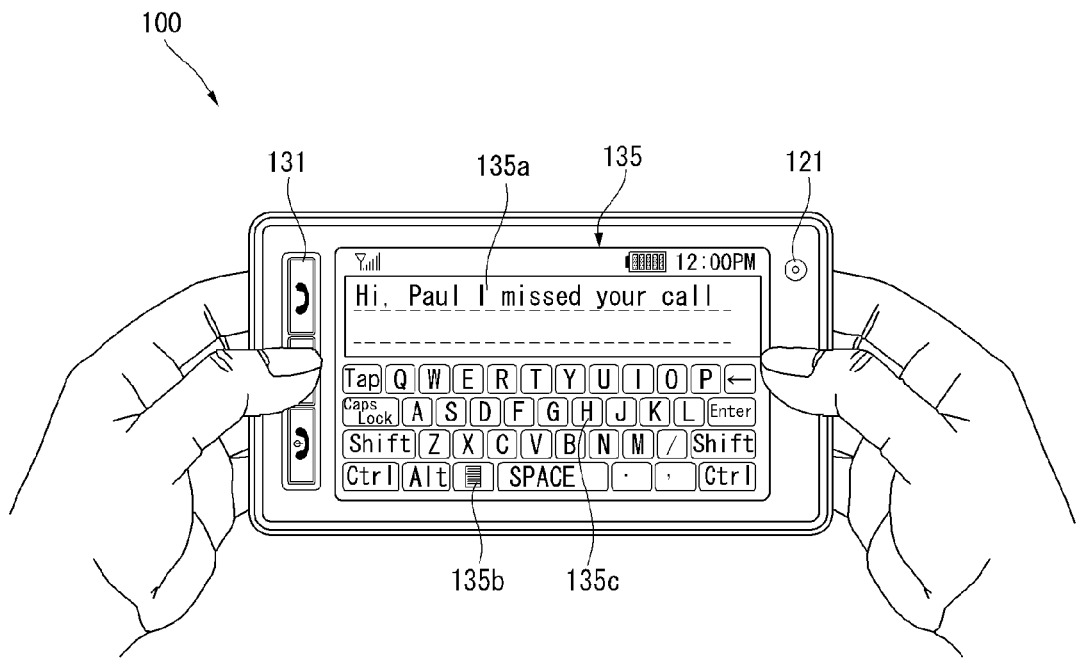
FIG. 7B is a view illustrating a second operational mode of the mobile terminal according to an embodiment of the present invention.

FIG. 7A is a view illustrating a first operational mode of the mobile terminal 100 according to an embodiment of the present disclosure. FIG. 7B is a view illustrating a second operational mode of the mobile terminal 100 according to an embodiment of the present disclosure. Various types of visual information can be displayed on the display 151. For example, the visual information can be displayed using at least characters, numerals, symbols, graphics, or icons.

In order to input the visual information, at least one of the characters, numerals, symbols, graphics and icons are represented as a single predetermined array to be implemented in a keypad formation. The keypad formation can be referred to as "soft keys."

FIG. 7A shows the mobile terminal 100 having a vertical configuration (i.e., portrait), and FIG. 7B shows mobile terminal 100 having a horizontal configuration (i.e., landscape). The display 151 can be configured to change an output picture according to the arranged configuration of the mobile terminal 100.

Referring to FIG. 7A, a mobile terminal 100 according to an embodiment of the present disclosure includes a first manipulating unit 131, an output window 151a, an input window 151b, and a plurality of soft keys 151c.

The display 151 is operable through an entire area or through a plurality of regions. Each of the plurality of regions can be configured to be interoperable.

A front face of the mobile terminal 100 can receive an input by a touch applied to one of the plurality soft keys 151c. For example, the output window 151a and the input window 151b are displayed on the display 151. The one of the plurality of soft keys 151c representing a digit for inputting a phone number is displayed on the input window 151b. If the one of the plurality of soft keys 151c is touched, a digit corresponding to the touched soft key is displayed on the output window 151a. If the first manipulating unit 131 is manipulated, a call connection for the phone number displayed on the output window 151a is performed.

Referring to FIG. 7B, the mobile terminal 100 is configured in a text input mode. Accordingly, a rear face of the mobile terminal 100 can receive an input by a touch applied to one of the plurality of soft keys 135c.

An output window 135a and an input window 135b are displayed on the display 151. The plurality of soft keys 135c representing at least one of characters, symbols and digits can be arranged in the input window 135b. The soft keys 135c can be arranged in a QWERTY key formation.

If the plurality of soft keys 135c is touched through the touchpad 135, the characters, symbols and digits corresponding to the touched soft keys are displayed on the output window 135a. Thus, the touch input via the touchpad 135 is advantageous in that the plurality of soft keys 135c can be prevented from being blocked by a finger when touched, unlike a touch input via the display 151.

If the display 151 and the touchpad 135 are configured transparently, fingers located at the backside of the mobile terminal 100 can be seen. Hence, more correct touch inputs are possible.

The display 151 or the touchpad 135 can be configured to receive a touch input by a scrolling function. A user scrolls the display 151 or the touchpad 135 to shift a cursor or pointer located at an entity (e.g., icon) displayed on the display 151. If a finger is shifted on the display 151 or the touchpad 135, a path of the shifted finger can be visually displayed on the display 151. This may be useful in editing an image displayed on the display 151.

When the display 151, such as a touchscreen, and the touchpad 135 are touched together (e.g., clamped by a user using a thumb and a first finger) within a predetermined time range, the mobile terminal 100 can execute a function. For example, the function can include activation or deactivation of the display 151 or the touchpad 135.

Figure 8:
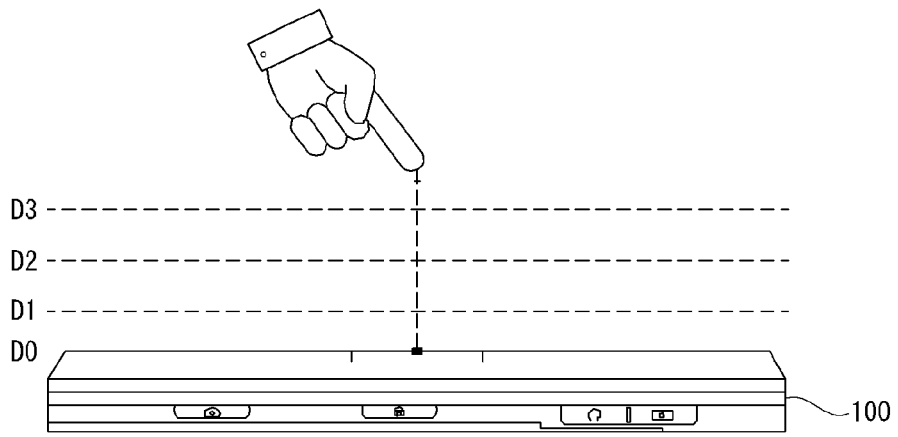
FIG. 8 is a cross-section view illustrating a proximate depth of a proximity sensor.

FIG. 8 is a cross-section diagram for explaining a proximity depth of a proximity sensor 141 (FIG. 5) according to an embodiment of the present disclosure. When a pointer, such as a user's finger or a pen approaches the display 151, the proximity sensor 141 provided within or in the vicinity of the display 151 detects the approach of the pointer and then outputs a proximity signal. The proximity sensor 141 can be configured to output a different proximity signal according to a distance between the pointer and the proximity-touched display 151 (hereinafter "proximity depth").

Referring to FIG. 8, a cross-section of the mobile terminal 100 is provided with the proximity sensor 141 capable of sensing three proximity depths, for example. It can be understood that the proximity sensor 141 can be capable of sensing proximity depths amounting to a number smaller than 3 and equal to or greater than 4.

For example, when the pointer is fully contacted with the display 151 at d0, the relation is recognized as a contact touch. When the pointer is spaced apart from the display 151 at a distance d1, the relation is recognized as a proximity touch at a first proximity depth. When the pointer is spaced apart from the display 151 at a distance between d1 and d2, the relation is recognized as a proximity touch at a second proximity depth. When the pointer is spaced apart from the display 151 at a distance between d2 and d3, the relation is recognized as a proximity touch at a third proximity depth. Further, when the pointer is spaced apart from the display 151 at a distance equal to or greater than d3, no proximity touch is recognized.

Hence, the controller 180 can recognize the proximity touch as one of various input signals according to the proximity depth and position of the pointer relative to the display 151. In some examples, the controller 180 can perform various operation controls according to the various input signals.

Figure 9:
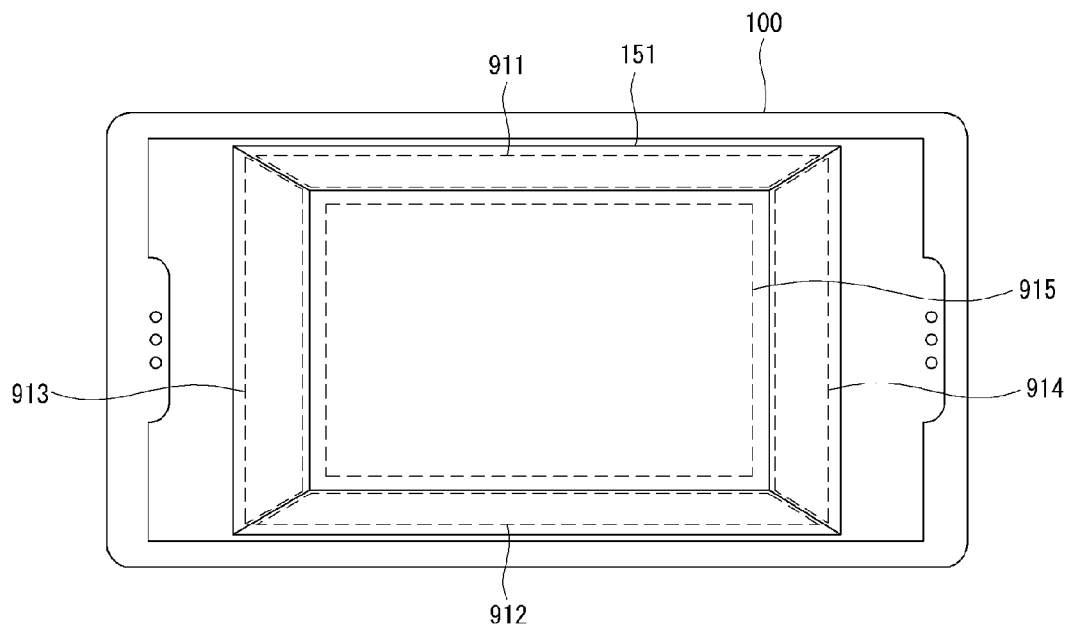
FIG. 9 is a view illustrating a three-dimensional (3D) graphical user interface (GUI) provided in the mobile terminal according to an embodiment of the present invention.

FIG. 9 is a view illustrating a three-dimensional (3D) graphical user interface (GUI) provided in the mobile terminal via the display 151 according to an embodiment of the present disclosure.

The controller 180 (FIG. 5) can set at least one area of the 3D GUI to display information corresponding to an electronic device connected to a network. Moreover, each of the at least one areas can display information corresponding to a different electronic device on the network.

Referring to FIG. 9, the 3D GUI comprises a first area 911, a second area 912, a third area 913, a fourth area 914 and a center area 915 that abuts with the first through fourth areas to form a boxed shape portraying height, width and depth. The controller 180 may be configured to set each of the areas of the 3D GUI. In some embodiments, the 3D GUI may be portrayed in other multi-faceted shapes including at least a sphere, a triangle or octagon.

The controller 180 may control different types of information to correspond to each area of the 3D GUI. For example, the controller 180 may set information pertaining to the external electronic devices 10a, 10b and 10c (FIG. 6B) at each of the areas of the 3D GUI (e.g., first area 911, second area 912, third area 913, fourth area 914).

Figure 10:
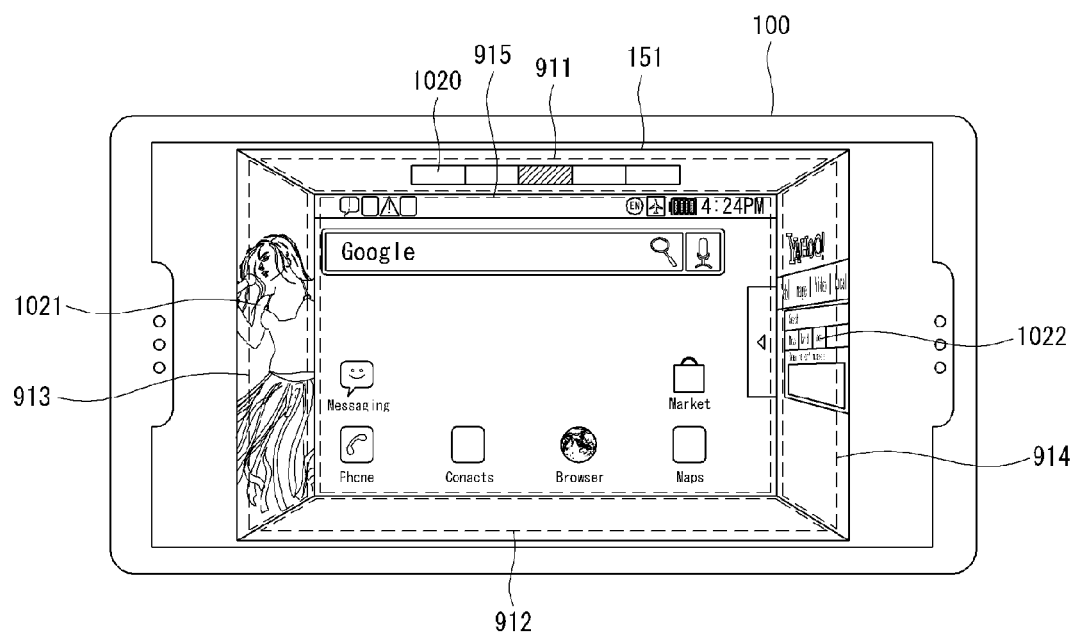
FIG. 10 is a view illustrating information corresponding to external electronic devices provided on different areas of the 3D GUI in the mobile terminal according to an embodiment of the present invention.

FIG. 10 is a view illustrating information corresponding to electronic devices provided on different areas of the 3D GUI in the mobile terminal 100 according to an embodiment of the present disclosure.

Referring to FIG. 10, the controller 180 may set the third area 913 as an area for displaying information about the external electronic device 10c (e.g., DTV), and set the fourth area 914 as an area for displaying information about the external electronic device 10b (e.g., computer).

The third area 913 can display content 1021 that is output to the external electronic device 10b. Moreover, the fourth area 914 can display content 1022 that is output to the external electronic device 10c. In some embodiments, the controller 180 may receive the content 1021 and 1022 from the external electronic devices 10b and 10c via the wireless communication unit 110.

Furthermore, the controller 180 provides information about connection states between the mobile terminal 100 and the plurality of external electronic devices (e.g., the external electronic devices 10a, 10b, and 10c). For example, a second GUI 1020 for executing control operations associated with the connection states can be displayed on a corresponding area of the 3D GUI, such as the first area 911.

In some embodiments, the mobile terminal 100 can be connected to the plurality of external electronic devices over a network according to the DLNA network.

Figure 11A:
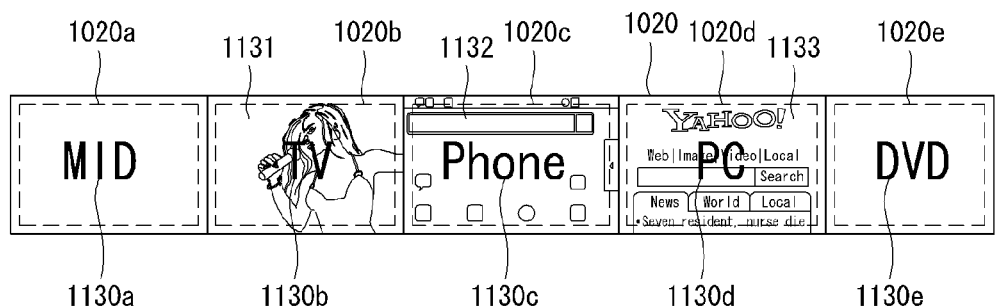
FIGS. 11A to 11B are panoramic views illustrating a control bar object including functions for controlling external electronic devices according to exemplary embodiments of the present invention.
Figure 11B:
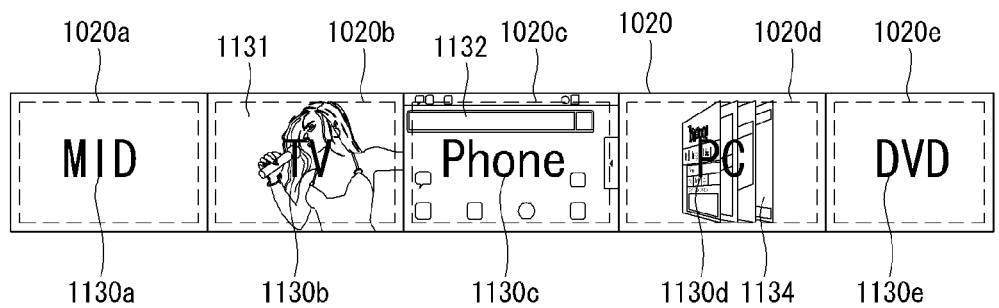

FIGS. 11A and 11B are panoramic views illustrating a second GUI including functions for controlling electronic devices connected to the mobile terminal 100 according to an embodiment of the present disclosure.

The second GUI 1020 may be configured in a two-dimensional array. Alternatively, the second GUI 20 may be configured in a three-dimensional array as described later with reference to FIGS. 12 and 13.

Figure 12:
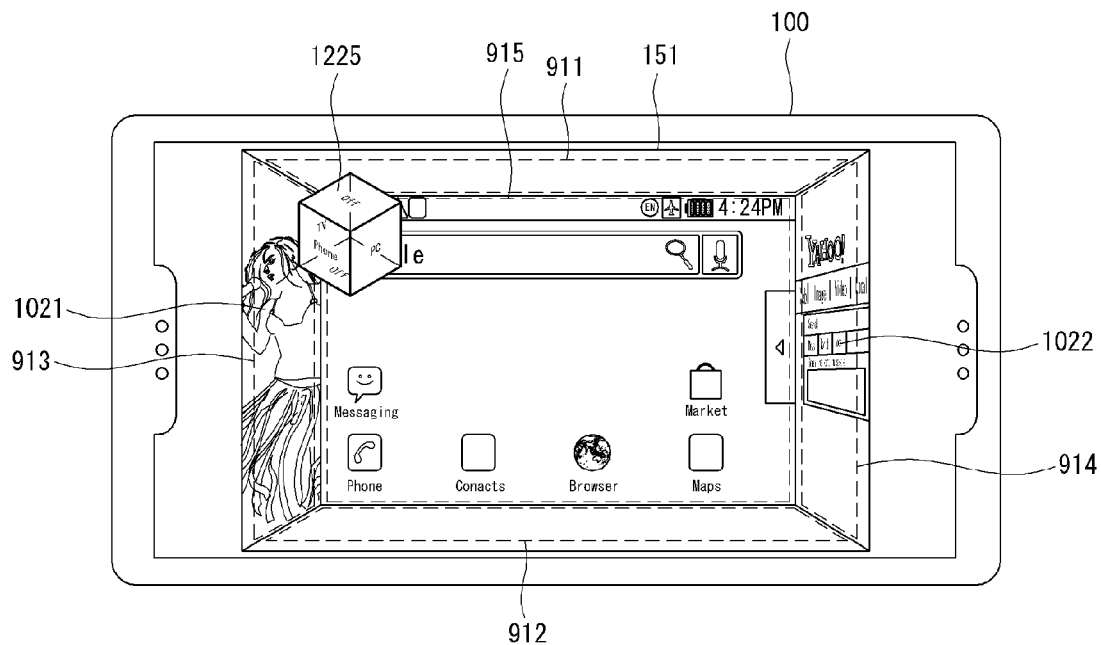
FIG. 12 is a view illustrating a second 3D GUI being provided in a first 3D GUI of the mobile terminal according to an embodiment of the present invention.
Figure 13:
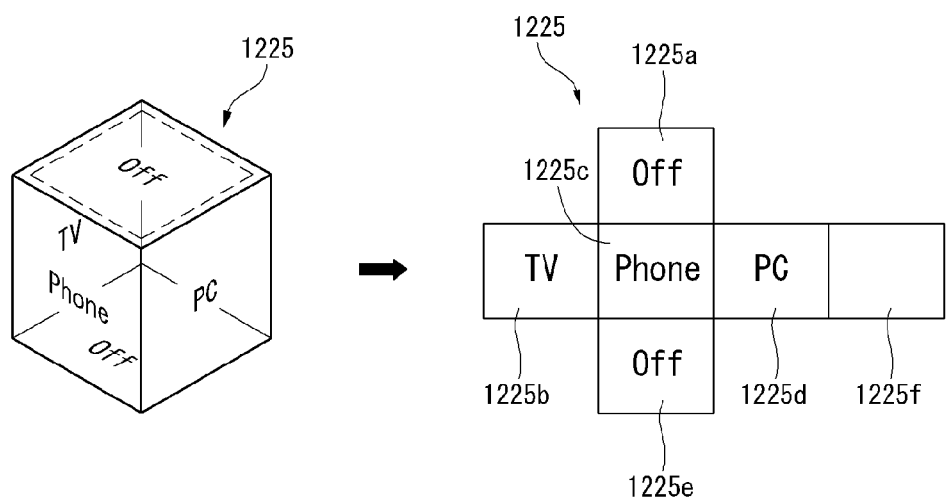
FIG. 13 is an exploded view illustrating the second 3D GUI being provided in the first 3D GUI of the mobile terminal according to an embodiment of the present invention.

The technical characteristics of the second GUI 1020 as a two-dimensional (2D) object may also be applicable if the second GUI 1020 is a three-dimensional object (FIGS. 12 and 13).

Referring to FIG. 11A, the second GUI 1020 may comprise a plurality of information areas 1020a, 1020b, 1020d, and 1020e, which each correspond to one of the plurality of external electronic devices 10a, 10b, and 10c. Each information area provides information about the state of the connection (e.g., DLNA connection) between the mobile terminal 100 and a corresponding electronic device (e.g., 10a, 10b, 10c).

In one embodiment, the first information area 1020a corresponds to the external electronic device 10a (e.g., MID), the second information area 1020b corresponds to the external electronic device 10c (e.g., DTV), the third information area 1020c corresponds to the mobile terminal 100 for providing information about the current state of the mobile terminal 100, the fourth information area 1020d corresponds to the external electronic device 10b (e.g., computer), and the fifth information area 1020e may correspond to another external electronic device (e.g., digital video recorder) connected to the mobile terminal 100 over the network.

In some embodiments, the third information area 1020c may display information related to content being displayed in the area 915 of the mobile terminal 100.

Each of the information areas comprises a label (e.g., reference numerals 1130a to 1130e) to denote identification information about the corresponding electronic device (i.e., name). For example, a user can identify the electronic device corresponding to one of the plurality of information areas 20a to 20e based on the label.

In some examples, the content conveyed in the information areas to describe the connection states may include information about an existing connection or disconnection for data communication between the mobile terminal 100 and the plurality of external electronic devices (e.g., 10a, 10b, 10c). Moreover, the content may also convey information about the powering status of the plurality of external electronic devices, such as whether the respective electronic device is powered on or off.

The controller 180 (FIG. 5) may control the display 151 to display content being output from the mobile terminal 100 to an electronic device in connection with the mobile terminal 100, or may further display other arbitrary content in one of the information areas corresponding to the connected electronic device.

Moreover, the controller 180 (FIG. 5) may control the display 151 to further display information related to an application running on the connected electronic device in the information area corresponding to the connected electronic device. For example, the information may include images of the application as displayed on the connected electronic device.

The presence of content (e.g., content 1131, 1132, 1133) being displayed in at least one of the information areas 1020a to 1020e describes which corresponding electronic device is connected to the mobile terminal 100 over the DLNA network.

Alternatively, the presence of no content being displayed in at least one of the information areas 1020a to 1020e describes which corresponding electronic device is not connected to the mobile terminal 100 over the DLNA network.

Referring to FIG. 11B, the controller 180 may be configured to group multiple sets of information in an electronic device connected to the mobile terminal 100 over the network. For instance, if the controller 180 determines that multiple sets of information exist in the connected electronic device, the controller 180 may group the multiple sets of information as grouped information 1134 and display the grouped information 1134 in a corresponding information area, such as the fourth information area 1020d.

For example, if there are a plurality of applications (e.g., web browsers) running on the external electronic device 10b (e.g., computer) or content from a plurality of accessed webpages being displayed, then the controller 180 may group and display the grouped information 1134 in the fourth information area 1020d corresponding to the external electronic device 10b.

FIG. 12 is a view illustrating a second 3D GUI 1225 being provided in the first 3D GUI of the mobile terminal 100 according to an embodiment of the present disclosure.

Referring to FIG. 12, the second 3D GUI 1225 may be displayed relative to the first 3D GUI on a predetermined position of the display 151. The second 3D GUI 1225 may comprise functions similar to those of the 2D second GUI 1020 (FIGS. 11A-11B).

FIG. 13 is an exploded view illustrating the second 3D GUI 1225 being provided in first the 3D GUI of the mobile terminal 100 according to an embodiment of the present disclosure.

Referring to FIG. 13, the second 3D GUI 1225 may comprise information areas 1225a, 1225b, 1225c, 1225d, and 1225e. Each information area of the second 3D GUI 1225 is capable of performing the same function as the information areas (e.g., 1020a, 1020b, 1020c, 1020d, 1020e) of the 2D second GUI 1020 (FIGS. 11A, 11B).

In some embodiments, the second 3D GUI 1225 may a multi-faceted polygon shape, such as a cube. Each of the information areas 1225a, 1225b, 1225c, 1225d, and 1225e may be designated to a face of the second 3D GUI 1225.

It is contemplated that not all of the faces of the second 3D GUI 1225 may be set with an information area corresponding to an electronic device. In some examples, at least one face may be reserved for a future registration or access to a particular electronic device. For example, the information area 1225f may be configured not to correspond to information of a particular electronic device, but rather the information area 1225f is reserved to allow a new electronic device to be registered or accessed on the DLNA network.

Figure 14:
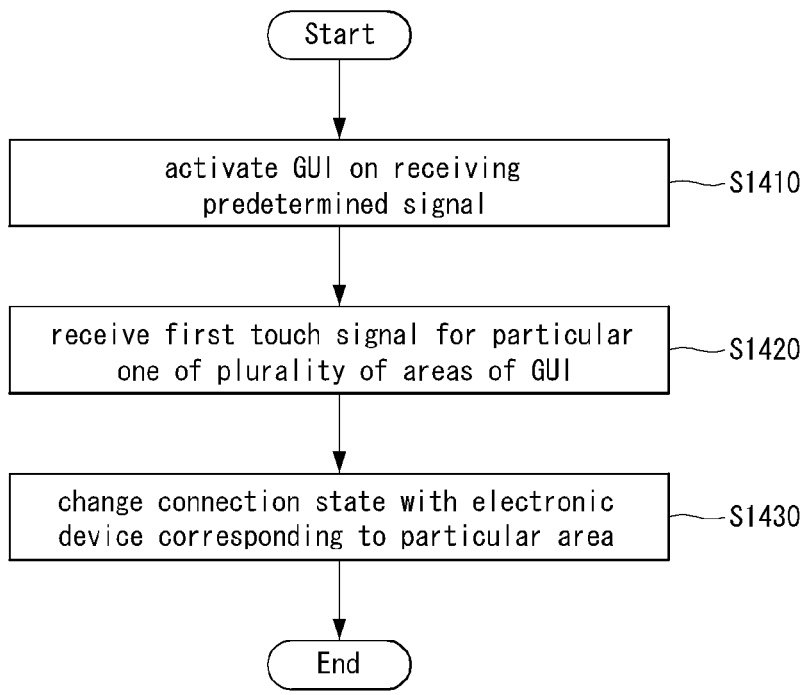
FIG. 14 is a flowchart of a method of controlling an external electronic device via the mobile terminal according to an embodiment of the present invention.

FIG. 14 is a flowchart of a method of controlling an electronic device according to an embodiment of the present disclosure. In one embodiment, the method of controlling an electronic device can be performed by the mobile terminal 100. In another embodiment, the method can be performed by at least one of the plurality of external electronic devices 10a to 10c (FIG. 6B).

For convenience of description, the method of controlling an electronic device will be discussed with regard to the mobile terminal 100 being configured to perform the method.

The method includes the controller 180 activating the second GUI 1020 or second 3D GUI 1225 upon receiving a predetermined signal via the display 151 or the user input unit 130 (S1410).

For example, a user of the mobile terminal 100 can activate the second GUI 1020 by touching a certain point of an area where the second GUI 1020 is displayed. Alternatively, the user may touch a certain point where the second 3D GUI 1225 is displayed. Moreover, the user can activate the second GUI 1020 by pressing a particular key or button included in the user input unit 130.

The method also includes the controller 180 receiving a first touch signal for a particular information area of the plurality of information areas provided in the second GUI 1020 (S1420).

The method further includes the controller 180 changing a connection state between the mobile terminal 100 and an external electronic device corresponding to the particular information area (S1430).

Figure 15:
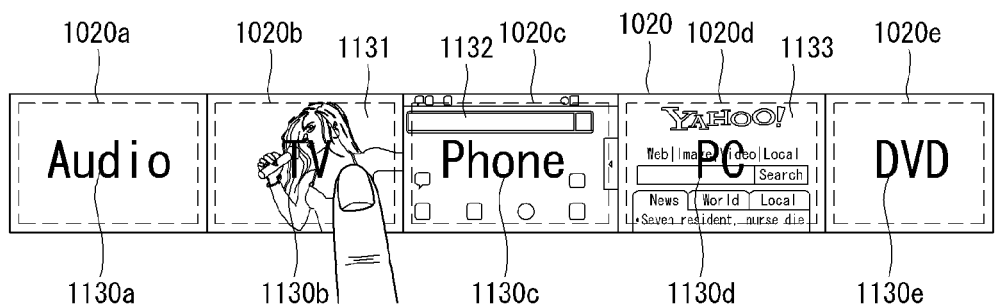
FIGS. 15 and 16 are views illustrating a manipulation of the second GUI for controlling an external electronic device according to an embodiment of the present invention.
Figure 16:
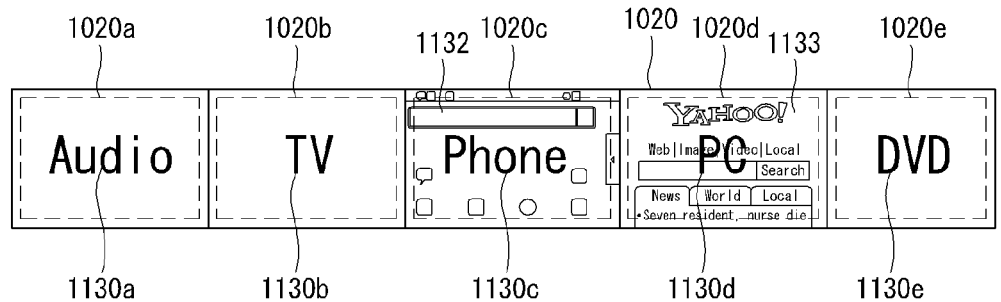

FIGS. 15 and 16 are views illustrating a manipulation of the second GUI 1020 for controlling an external electronic device according to an embodiment of the present disclosure.

Referring to FIG. 15, a user's touch may be sensed over the second information area 1020b of the second GUI 1020 corresponding to the external electronic device 10c (DTV). That is, a touch signal corresponding to a selected information area may be received via the display 151.

Upon receiving the touch signal with regard to the second information area 1020b, the controller 180 can change the connection state of the external electronic device 10c (DTV), such as powering off the television. In another example, the user may desire to power on the television, so a subsequent touch signal may be sensed at the second information area 1020b of the second GUI 1020 to power on the television.

Referring to FIG. 16, the controller 180 can control the display of the second GUI 1020 to show no output to the fourth external electronic device 10c (e.g., "no connection state") by removing the content 1131 from the second information area 1020b when the connection state between the mobile terminal 100 and the electronic device 10c is terminated.

Figure 17:
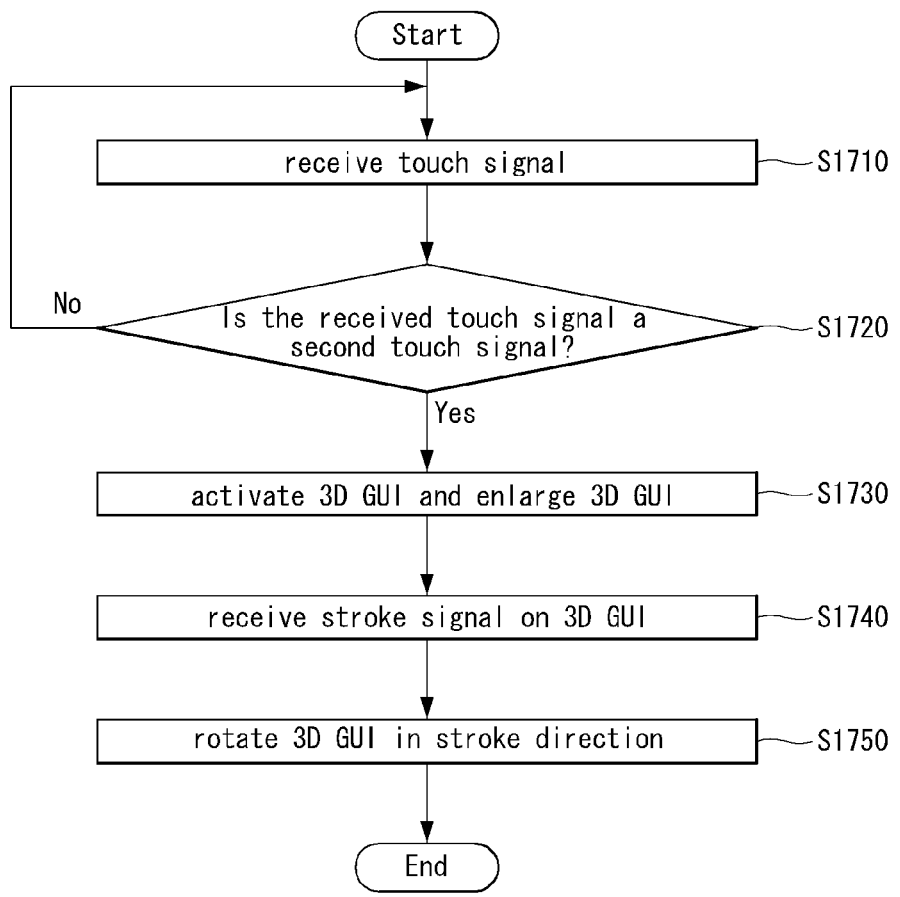
FIG. 17 is a flowchart of a method of controlling an external electronic device according to another embodiment of the present invention.

FIG. 17 is a flowchart of a method of controlling an electronic device according to another embodiment of the present disclosure.

In one embodiment, the method of controlling an electronic device can be performed by the mobile terminal 100. In another embodiment, the method can be performed by at least one of the plurality of external electronic devices 10a to 10c (FIG. 2).

For convenience of description, the method of controlling an electronic device will be discussed with regard to the mobile terminal 100 being configured to perform the method.

The method can include the controller 180 receiving a touch signal via the second 3D GUI 1225 (S1710).

The controller 180 determines whether the received touch input is a predetermined second touch input (S1720).

If the received touch signal is the second touch signal, the second 3D GUI 1225 can be activated, and the second 3D GUI 1225 can be enlarged in size (S1730). Otherwise, the controller 180 continues checking the received touch signal until the second touch signal is detected.

While the second 3D GUI 1225 is in an activated state, the controller 180 can receive a stroke signal in a particular direction relative to the second 3D GUI 1225 (S1740).

Further, the method may include the controller 180 controlling the second 3D GUI 1225 by rotating the second 3D GUI 1225 according to the particular direction of the received stroke signal (S1750).

FIGS. 18 to 21 are views illustrating a manipulation of the second 3D GUI 1225 for controlling an electronic device according to the another embodiment of the present disclosure.

Figure 18:
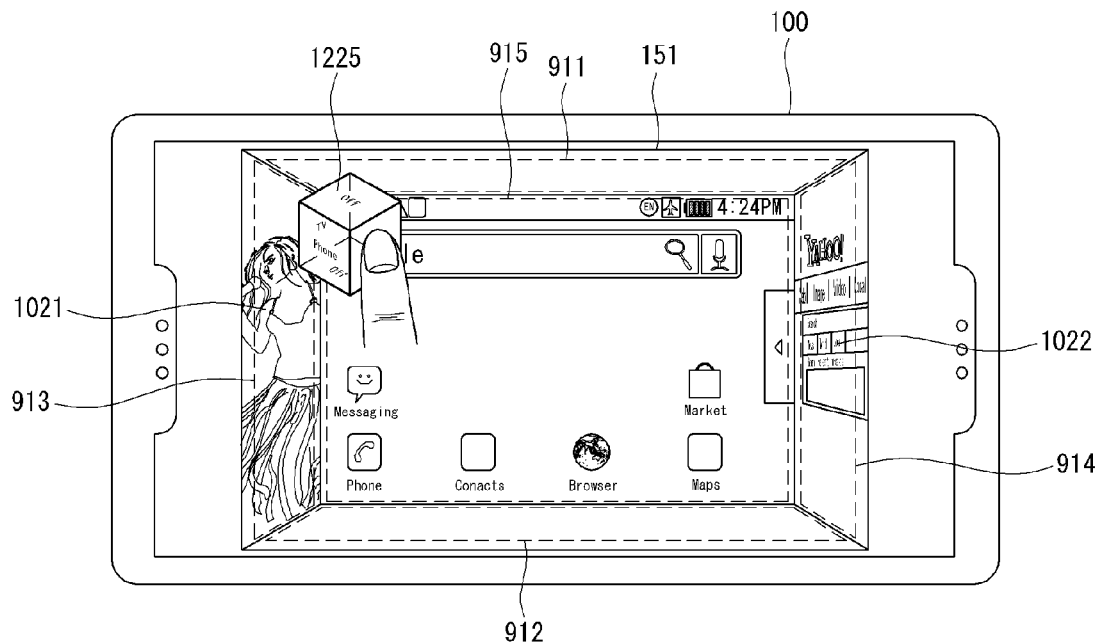
FIGS. 18 to 21 are views illustrating a manipulation of the second 3D GUI for controlling an external electronic device according to the another embodiment of the present invention.

Referring to FIG. 18, a touch signal may be sensed on the second 3D GUI 1225. In one embodiment, the touch signal may last for more than a predetermined time to designate a long touch signal.

Figure 19:
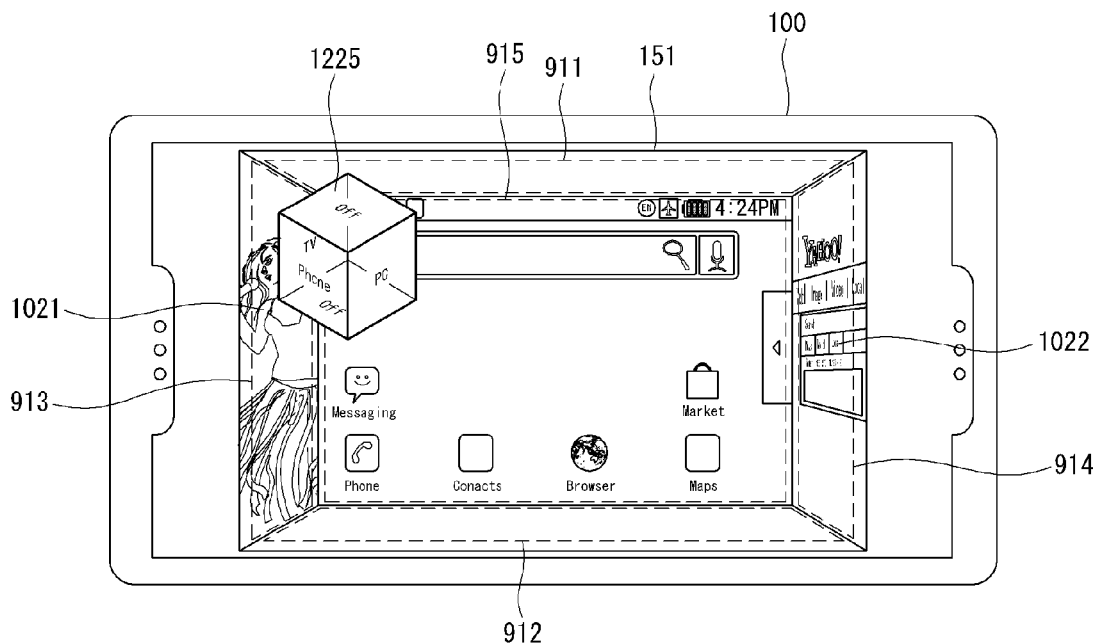

Referring to FIG. 19, the controller 180 can change the second 3D GUI 1225. Upon receiving the long touch signal, the controller 180 can change the powering status of the second 3D GUI 1225 from a deactivated state to an activated state. Additionally, the controller 180 can enlarge the second 3D GUI 1225 to make user access to the second 3D GUI 1225 more efficient and convenient.

In some embodiments, the second 3D GUI 1225 may remain deactivated in the event that the received touch signal is sensed for less than the predetermined time or sensed multiple times when the second 3D GUI 1225 is in a deactivated state.

Figure 20:
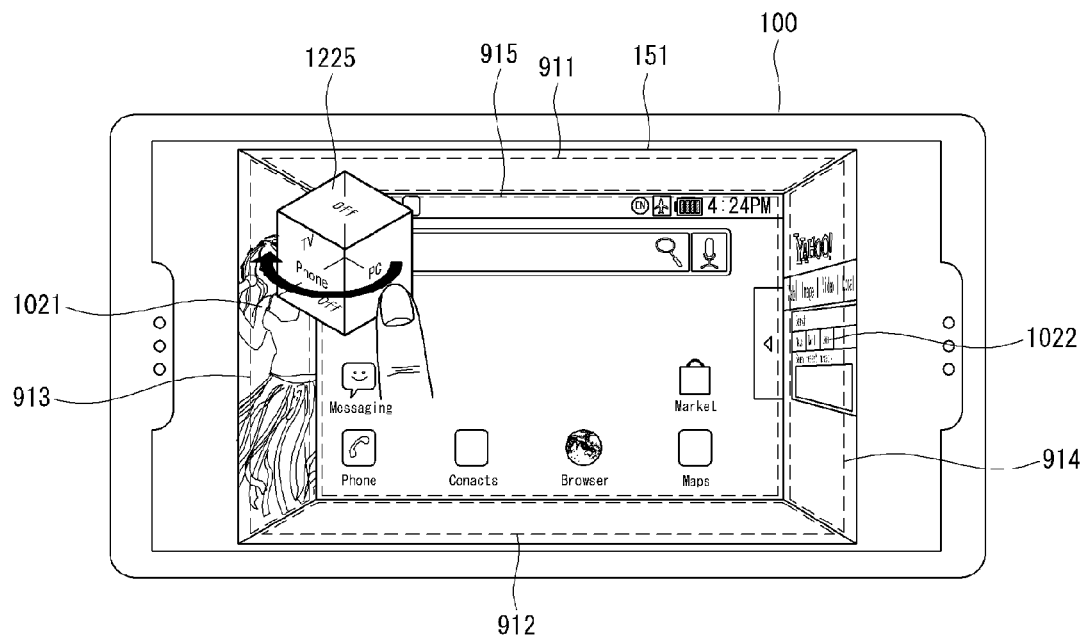

Referring to FIG. 20, a stroke signal may be sensed on the second 3D GUI 1225. In one embodiment, the stroke signal may be in a leftward direction. In another embodiment, the stroke signal may be in a rightward direction. For example, the user can drag or flick the second 3D GUI 1225 in the leftward direction.

In some embodiments, the degree of rotation may be determined regardless of the rate or intensity of the stroke. In other embodiments, the degree of rotation may be configured to be dependent of the rate or intensity of the stroke.

Figure 21:
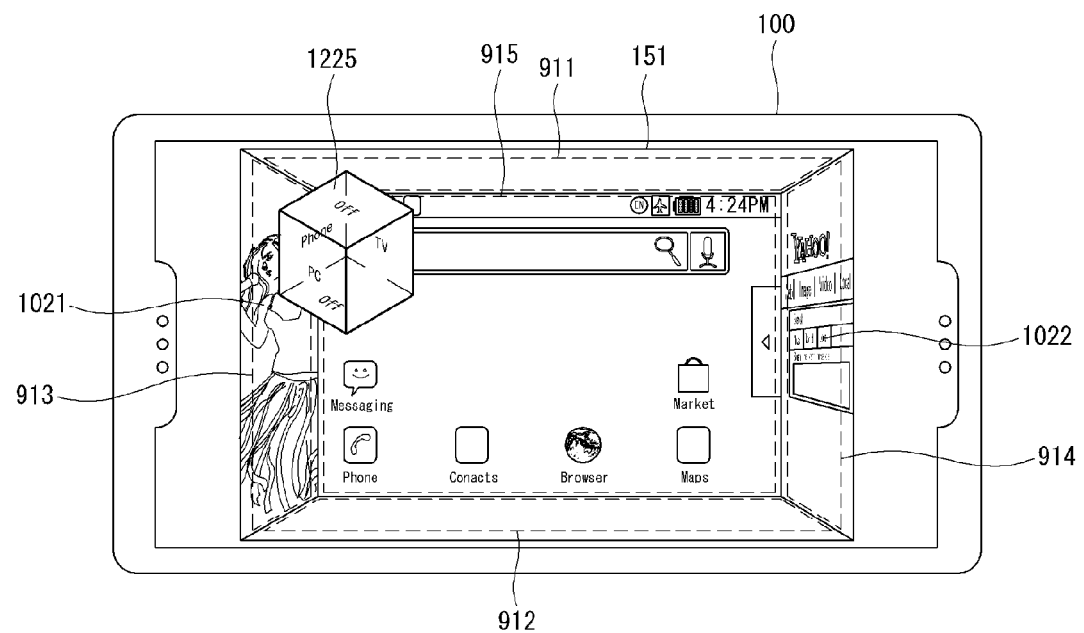

FIG. 21 illustrates an ending position of the second 3D GUI 1225 as a result of the received stroke signal. For example, the stroke signal caused the second 3D GUI 1225 to rotate leftward such that the fourth information area 1020*d* faces in the same direction as where the third information area 1020*c* faced in FIG. 20.

Figure 22:
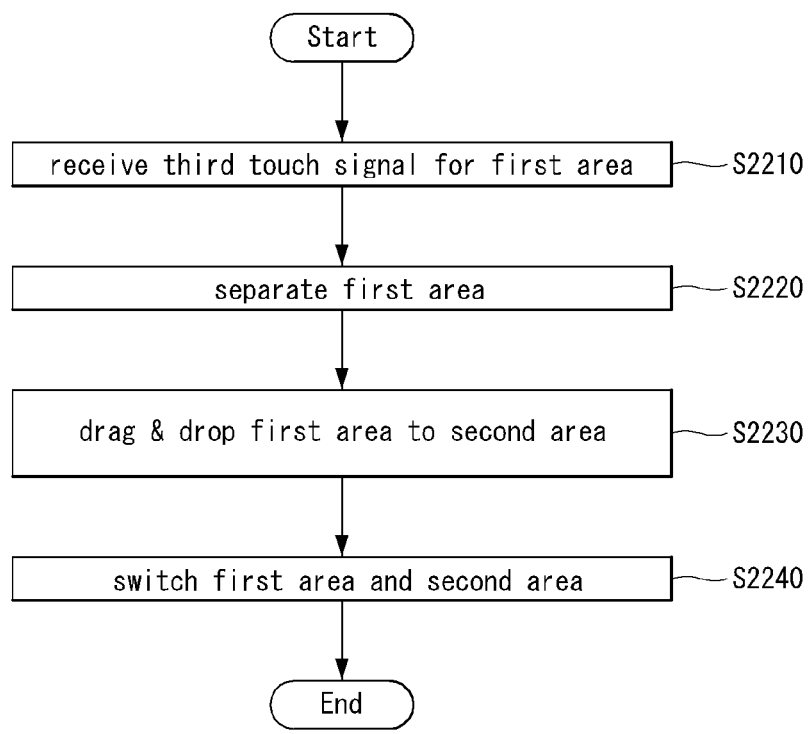
FIG. 22 is a flowchart of a method of controlling an external electronic device according to still another embodiment of the present invention.

FIG. 22 is a flowchart of a method of controlling an electronic device according to still another embodiment of the present disclosure.

The method includes the controller 180 receiving a third touch signal for one of the plurality of information areas 1225*a*, 1225*b*, 1225*c*, 1225*d*, and 1225*e* included in the second 3D GUI 1225 (S2210).

On receiving the third touch signal, the controller 180 can separate a first information area from the second 3D GUI (S2220). In other words, the third touch signal may request the controller to separate a particular face of the second 3D GUI which corresponds to an information area of a particular electronic device. In some embodiments, the separation of the selected information area may be evidenced by a disjoining of the faces in the second 3D GUI, a highlight or lighted indicator to indicate the separation.

The controller 180 can receive a touch signal (e.g., drag and drop signal) to drag the separated information area (e.g., the information area 1225*d*) and drop it on a second information area of the second 3D GUI (S2230).

The method further includes the controller 180 switching the separated information area with the second information area in response to the drag & drop signal (S2240).

Figure 23:
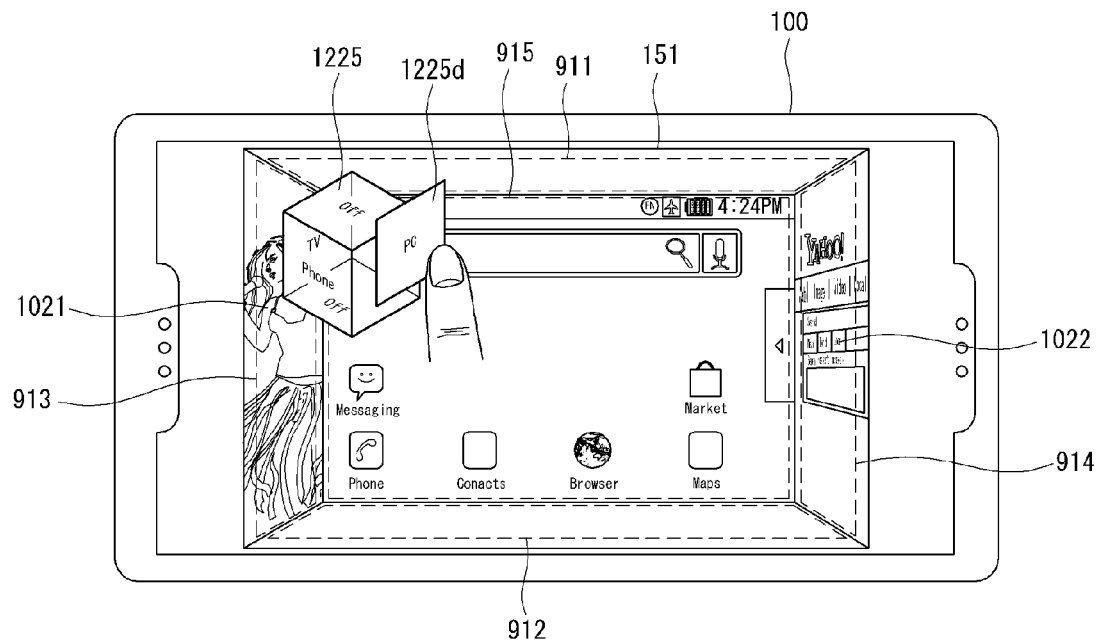
FIGS. 23 to 25 are views illustrating a manipulation of the second 3D GUI provided in the first 3D GUI for controlling an external electronic device according to the still another embodiment of the present invention.
Figure 24:
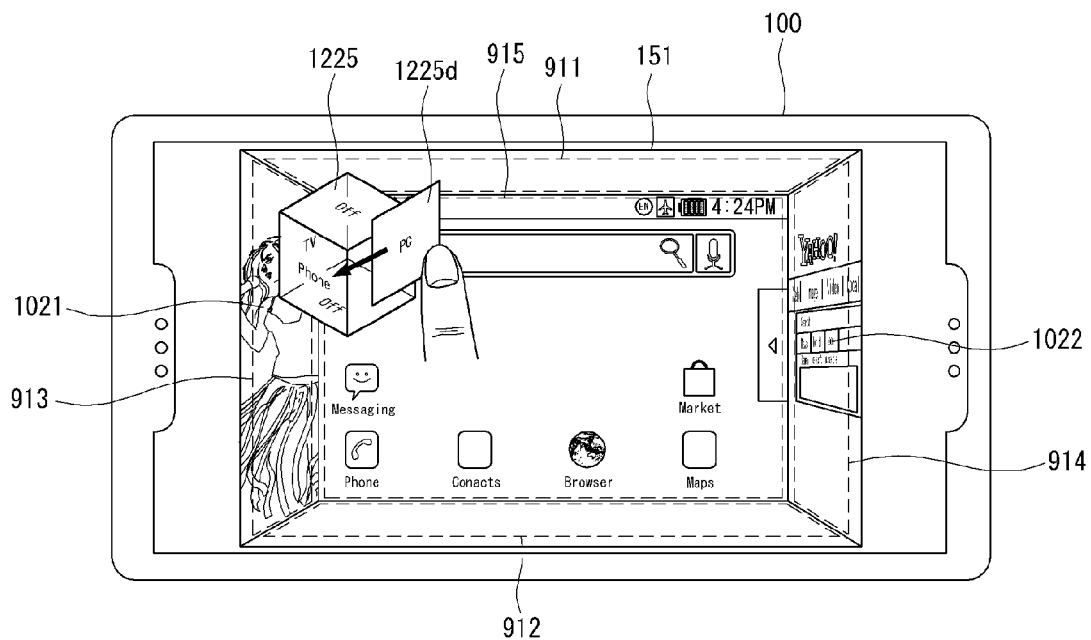
Figure 25:
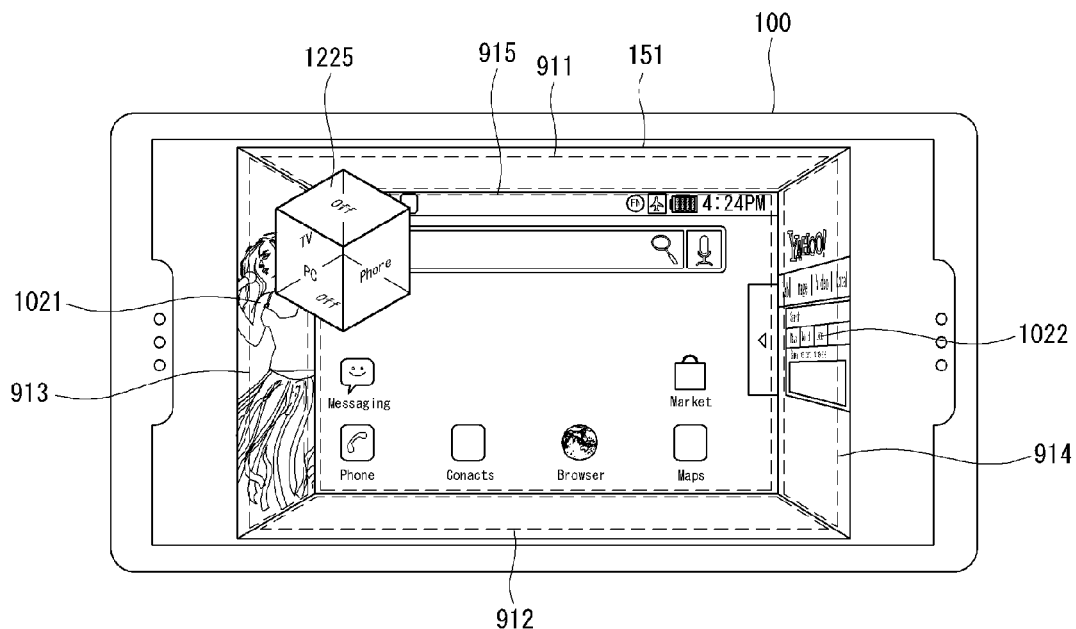

FIGS. 23 to 25 are views illustrating a manipulation of the second 3D GUI 1225 according to the still another embodiment of the present disclosure. This embodiment can be performed by a mobile terminal and/or by at least one of the plurality of external electronic devices 10*a* to 10*c* (FIG. 2). For convenience of description, the method of controlling an electronic device will be discussed with regard to the mobile terminal 100 being configured to perform the method.

In one embodiment, the third touch signal may be a stroke signal. In another embodiment, the third touch signal may be a long touch signal.

Referring to FIG. 23, a user sends a third touch input to the controller 180 (not shown) by touching one of the plurality of information areas 1225*a*, 1225*b*, 1225*c*, 1225*d*, and 1225*e* included in the second 3D GUI 1225. As a result, the controller 180 can separate a first information area from the second 3D GUI 1225. For example, when the user touches the information area 1225*d* (e.g., computer), the information area 1225*d* is separated from the second 3D GUI 1225. In this example, the separated information area is disjointed from the other information areas of the second 3D GUI 1225 via a drag & drop signal.

Referring to FIG. 24, the controller 180 receives a touch signal (e.g., drag and drop signal) to drag the separated information area (e.g., the information area 1225*d*) and drop it on a second information area of the second 3D GUI. For example, the user may drag the separated information area (e.g., information area 1225*d*) and drop it over the information area 1225*c* (e.g., area corresponding to the mobile terminal 100).

Referring to FIG. 25, the controller 180 switches the separated information area (e.g., information area 1225*d*) with the second information area (e.g., information area 1225*c*) in response to the drag & drop signal illustrated in FIG. 24.

Although the exemplary embodiment described with reference to FIGS. 22 to 25 was directed to a 3D rendering of the second GUI 1020, for convenience of explanation, this exemplary embodiment may also be applicable to the 2D rendering of the second GUI 1020.

Figure 26:
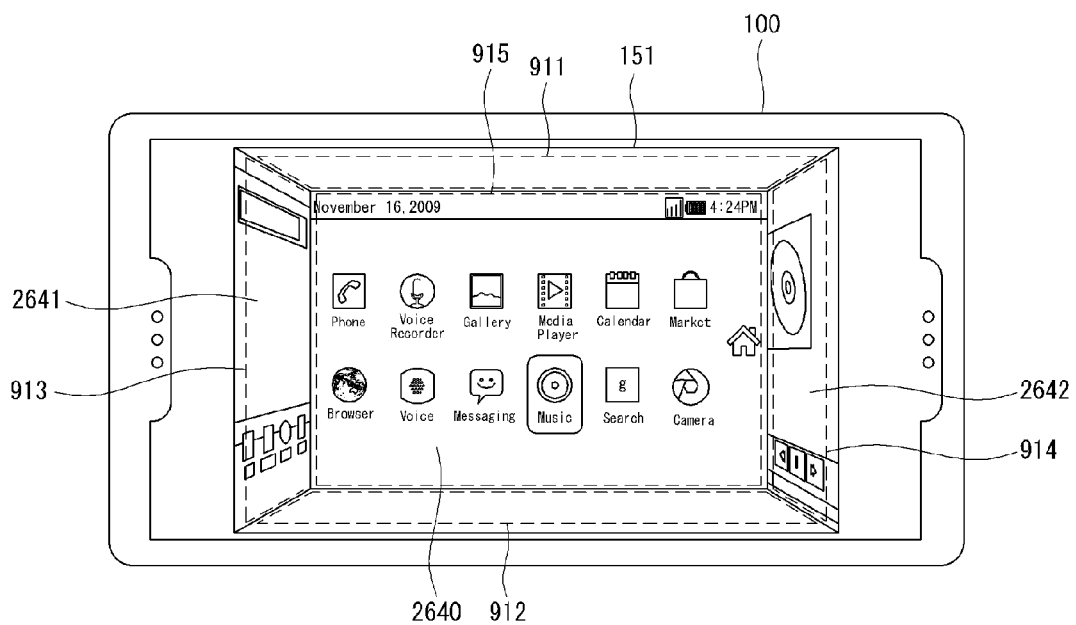
FIG. 26 is a view illustrating a visual configuration of the 3D GUI according to an embodiment of the present invention.

FIG. 26 is a view illustrating a visual configuration of the 3D GUI according to an embodiment of the present disclosure.

The controller 180 may control the display 151 to display the 3D GUI according to particular dimensions such that a spatial depth of the fifth area 915 and a spatial depth of each the first to fourth areas 911, 912, 913, and 914 are different from each other.

The controller 180 may further control the display 151 to display the 3D GUI according to other particular dimensions such that the spatial depth of a first edge of one area of the first to fourth areas 911, 912, 913, and 914 relative to a second edge of the same area is equal to the spatial depth of the fifth area 915.

For example, a first edge of the third area 913 that appears to protrude from the fifth area 915 relative to the other edge of the third area 913 bordering the fifth area 915 give the third area 913 a perspective view a depth similarly, if not equivalent, to the fifth area 915.

The controller 180 may also control the spatial depth of the first area 911, second area 912, and fourth area 914 the same way as the third area 913.

By providing particular dimensions, the controller 180 can control the display 151 to display the first to fourth areas 911, 912, 913, and 914 in a perspective view as a three-dimensional array, thereby providing the user with a sense of virtual space in the 3D GUI.

In some embodiments, the first to fifth areas 911, 912, 913, 914 and 915 may not be necessarily configured to display information corresponding to an electronic device on the network. Accordingly, the first to fifth areas 911, 912, 913, 914 and 915 may be set to display corresponding information when requested.

As stated above with reference to FIGS. 9 and 10, some, if not all, of the first to fourth areas 911, 912, 913, and 914 are configured to output information related to an electronic device, such as an external electronic device connected to the mobile terminal 100 over the network.

However, the output configuration of each of the areas is not limited to outputting information corresponding to the respective electronic device on the network.

Referring back to FIG. 26, the controller 180 may set at least a standby screen in the third area 913, a particular application in the fourth area 914, or a top-level menu group in the fifth area 915, and control the display 151 to display the set information in the respective areas of the 3D GUI. Moreover, the controller 180 may display different standby screens or home screens in the third area 913, the fourth area 914, and the fifth area 915.

Additionally, the controller 180 may control the display 151 to display a current screen in the fifth area 915, a screen previous to the current screen in the third area 913, and a screen subsequent to the current screen in the fourth area 914.

The information displayed in the first to fifth areas 911, 912, 913, 914 and 915 may be changed in accordance with a particular input signal.

Figure 27:
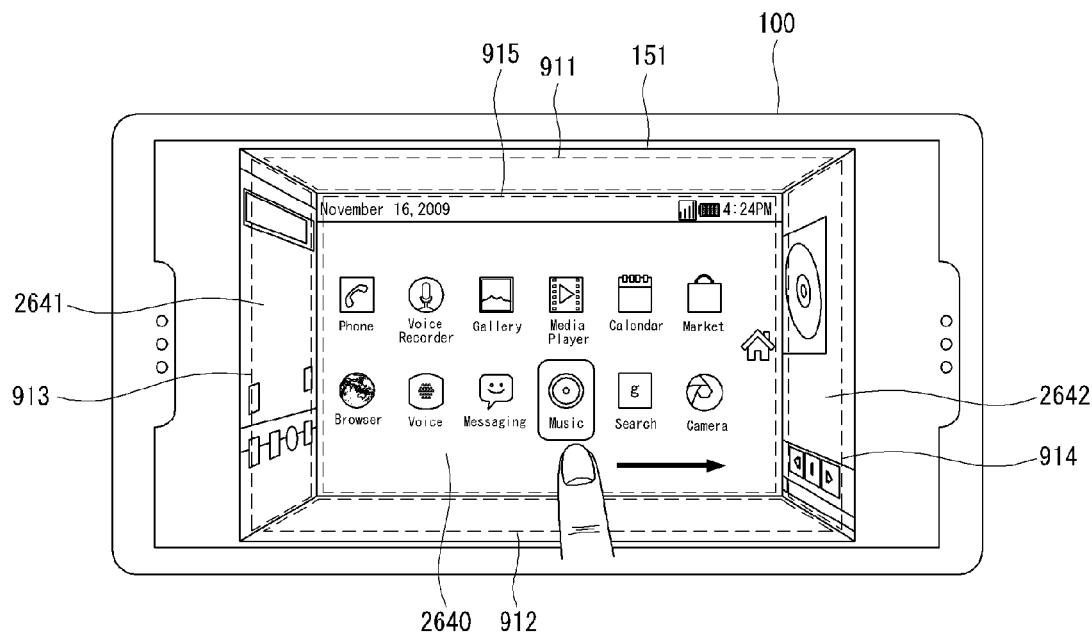
FIGS. 27 and 28 are views illustrating a stroke signal changing information corresponding to a plurality of areas in the 3D GUI according to an embodiment of the present invention.
Figure 28:
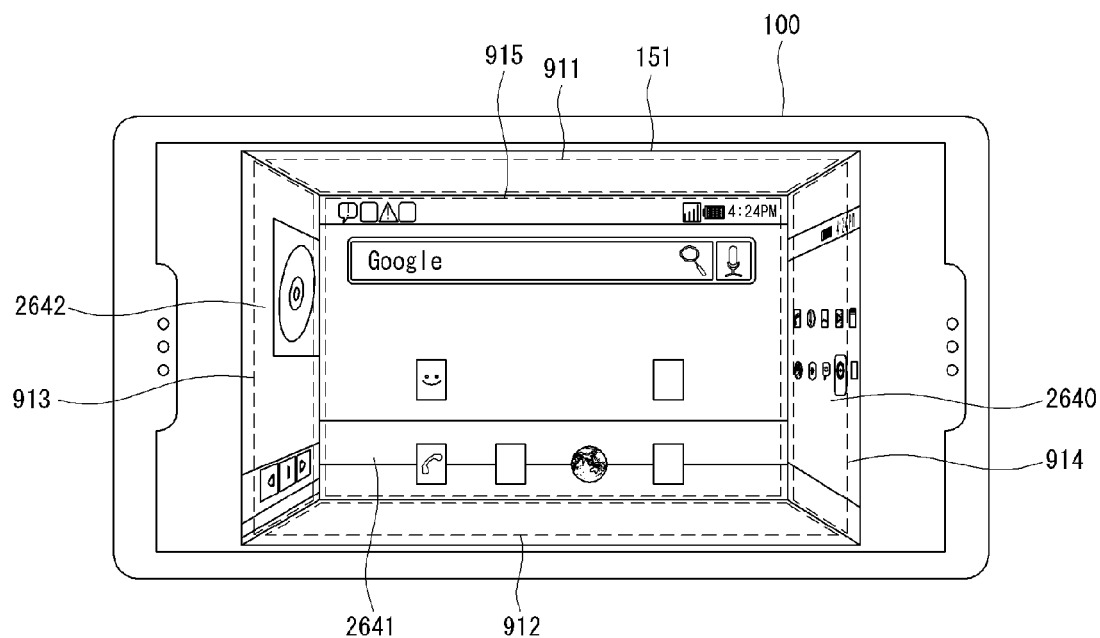

FIGS. 27 and 28 are views illustrating a stroke signal changing information corresponding to a plurality of areas in the 3D GUI according to an embodiment of the present disclosure.

The information displayed in the information areas 911 to 915 may be repositioned in response to an input signal via the display 151. Referring to FIG. 27, the user may drag or flick an area on the 3D GUI, thus, transferring the information from a first information area to a second information area. For example, a touch signal (e.g., a dragging signal in a rightward direction) from a user is sensed on the fifth area 15 requesting content 2640 displayed in the fifth area 915 to be transferred to the fourth information area 914. In some examples, the dragging signal appears to cause the information to be scrolled across the adjacent information areas (e.g., fifth 915, fourth area 914).

Referring to FIG. 28, the controller 180 can control how the information can be displayed in each area. The information requested to be moved from one area to another area can be scrolled across from an originating information area (e.g., fifth area 915) to a destination information area (e.g., fourth area 914).

For example, the user requested the content 2640 to be moved from the fifth area 915 to the fourth area 914 as shown in FIG. 27. Accordingly, the content 2640 is repositioned to the fourth area 914 which causes content 2642 to move from the fourth area 914 to the third area 913, and further cause content 2641 to move from the third area 913 to the fifth area 915.

In other embodiments, the information can be scrolled vertically such that information originally displayed in the fifth area 915 can be scrolled upward to be redisplayed in the first area 911, or downward to be redisplayed in the second area 912.

Figure 29:
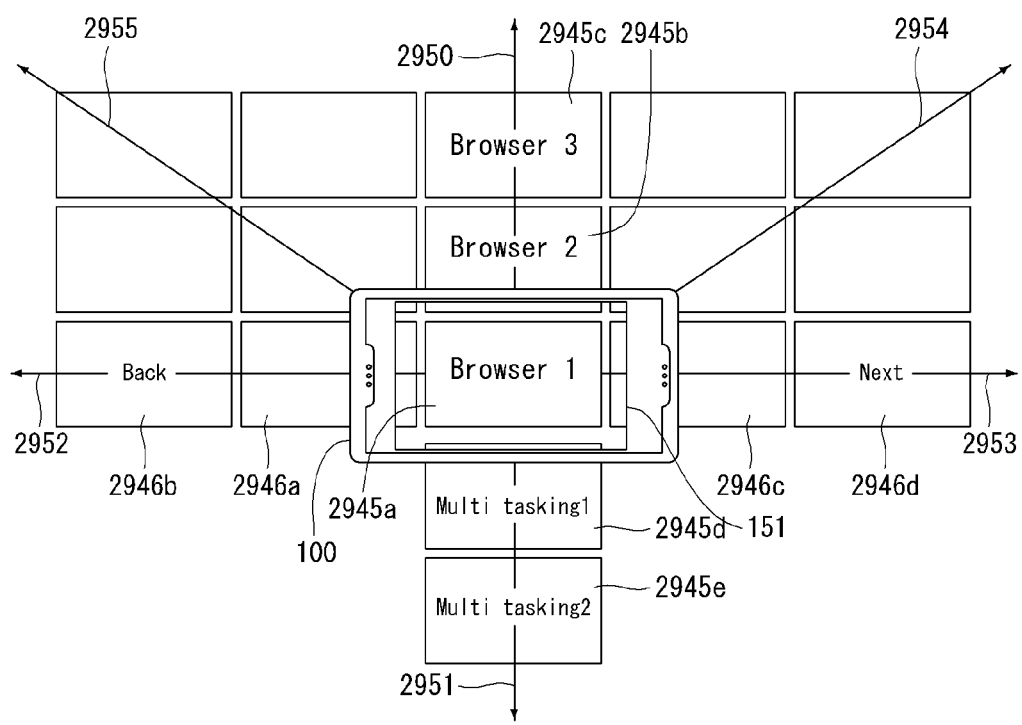
FIG. 29 is a view illustrating a stroke signal changing an array of information displayed in the plurality of areas of the 3D GUI in a direction corresponding to the stroke signal according to an embodiment of the present invention.

FIG. 29 is a view illustrating a stroke signal changing an array of information displayed in the plurality of areas of the 3D GUI in a direction corresponding to a received stroke signal according to an embodiment of the present disclosure.

Referring to FIG. 29, the display 151 displays a browser 1 2945a, a browser 2 2945b, a multitasking 1 2945d, a previous information area 2946a and a next information area 2946c. In some examples, the browser 1 2945a can be displayed in the fifth area 915 of the 3D GUI.

In a first example, when a user enters a stroke signal by either touching and dragging or touching and flicking an area on the display 151 in an upward direction 2950, the browser 1 2945a can be scrolled off the fifth area 915 and sequentially replaced by either the multitasking 1 2945d or multitasking 2 2945e.

In a second example, when the stroke signal is in a downward direction 2951, the browser 1 2945a can be scrolled off the fifth area 915 and sequentially replaced by either the browser 2 2945b or browser 3 2945c.

In a third example, when the stroke signal is in a leftward direction 2952, the browser 1 2945a can be scrolled off the fifth area 915 and sequentially replaced by either the previous information area 2946a or previous information area 2946b.

In a fourth example, when the stroke signal is in a rightward direction 2953, the browser 1 2945a can be scrolled off the fifth area 915 and sequentially replaced by either the next information area 2946c or next information area 2946d.

In some embodiments, the stroke signal may be received in an upward-right direction 2954 or in an upward-left direction 2955.

Figure 30:
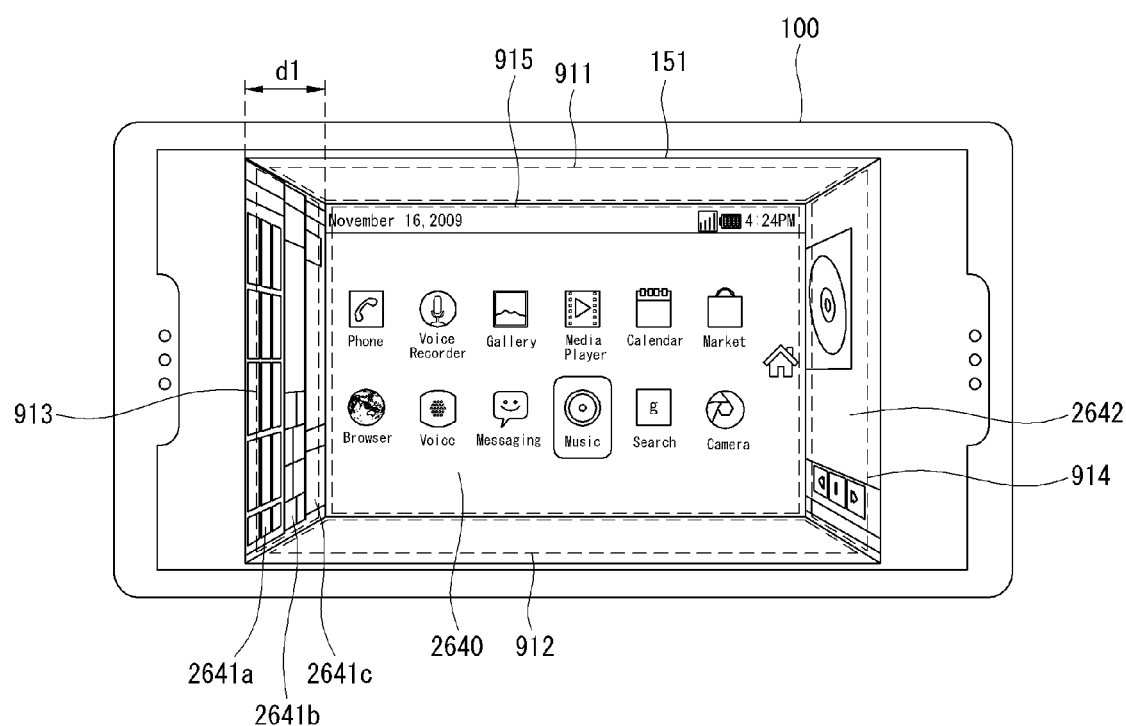
FIG. 30 is a view of the mobile terminal where a particular information area is configured to display information relating to multitasking according to an embodiment of the present invention.

FIG. 30 is a view of the mobile terminal 100 where a particular information area is configured to display information relating to multitasking according to an embodiment of the present disclosure.

Referring to FIG. 30, the controller 180 may control the display 151 to display applications 2641a, 2641b, and 2641c in the third area 913, which relate to multitasking applications.

If a number of multitasking applications (e.g., applications 2641a, 2641b, and 2641c) in the mobile terminal 100 is more than a predetermined value, some of the multitasking applications may be run on another electronic device to be in communication with the mobile terminal 100 over the DLNA network.

As such, the controller 180 may select a particular one of the plurality of external electronic devices (e.g., devices 10a, 10b, 10c) by taking into account the characteristics of the applications to be run on the selected electronic device. For example, a web browser may be instructed to run on a computer (e.g., external electronic device 10b of FIG. 6B), and broadcast content may be instructed to run on a DTV (e.g., external electronic device 10c of FIG. 6B).

Figure 31:
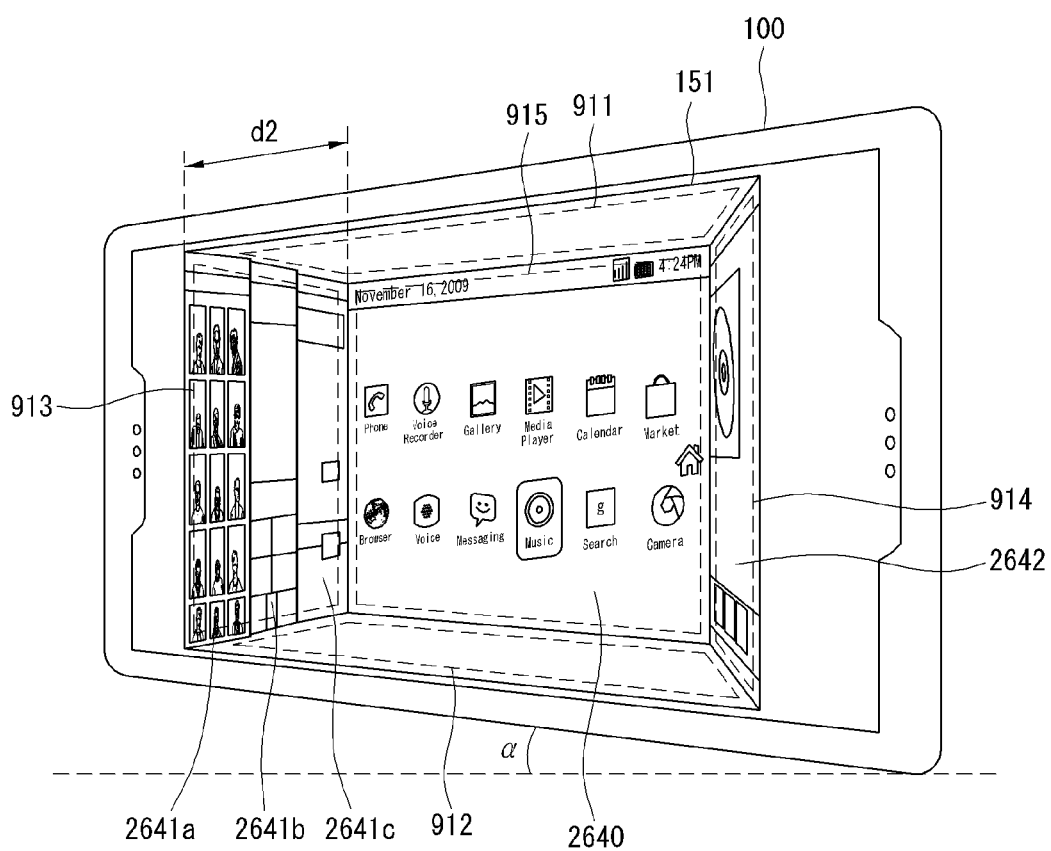
FIG. 31 is a perspective view illustrating a change in the visual configuration of the 3D GUI corresponding to a change in viewpoint of the mobile terminal according to an embodiment of the present invention.

FIG. 31 is a perspective view illustrating a change in the visual configuration of the 3D GUI corresponding to a change in viewpoint of the mobile terminal according to an embodiment of the present disclosure.

When a user's viewpoint of the mobile terminal 100 changes relative to the angle in handling the mobile terminal 100, the controller 180 may sense the reposition of the mobile terminal 100 and change the sizing of the first to fifth areas 911, 912, 913, 14 and 915 according to the changed viewpoint.

Referring back to FIG. 30, a user's viewpoint of the mobile terminal 100 provides a width d1 of the third area 913. Referring to FIG. 31, the user's viewpoint of the mobile terminal 100 provides a depth distance d2 of the third area 913.

When the mobile terminal 100 is compared between FIG. 30 and FIG. 31, the user's viewpoint in FIG. 31 appears to have changed with respect to angle α. That is, the user has tilted the left side of the mobile terminal 100 away from the user.

Referring to FIG. 31, the controller 180 may change the sizes of the first to fifth areas 911, 912, 913, 914 and 915 according to the change in angle (e.g., angle α) of the viewpoint. For example, the third area 913 has a width d1 (FIG. 30) which is changed to a width d2 (FIG. 31) when the user changed the viewpoint of the mobile terminal by angle α. As a result, the viewing angle of the third area 913 increases but the fourth area 914 and the fifth area 915 become smaller since the width increase corresponds to the direction and angle of the new viewpoint.

Figure 32:
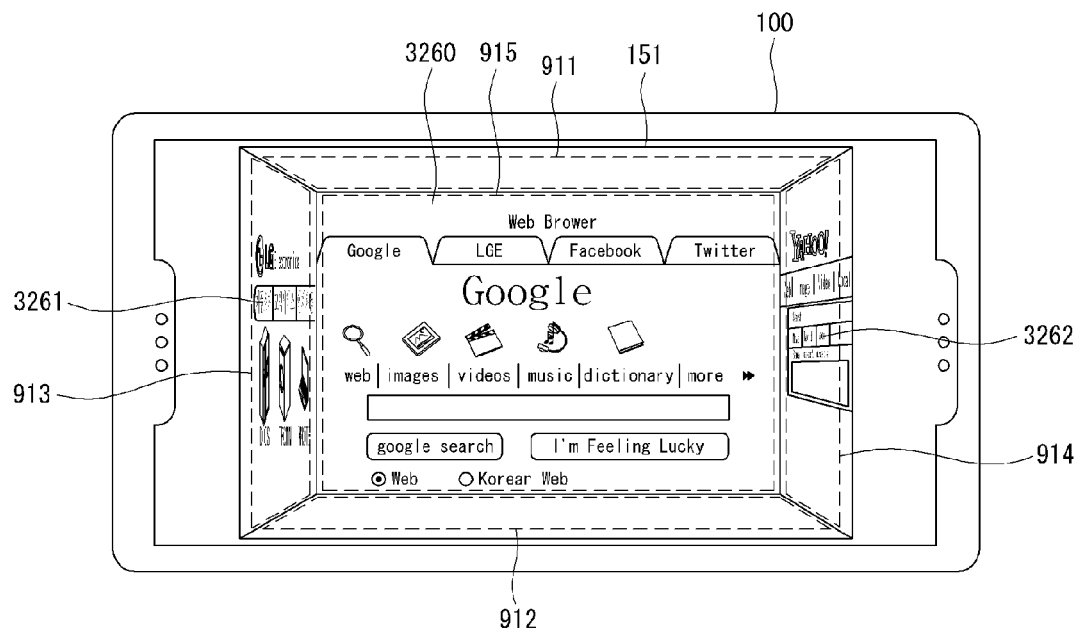
FIG. 32 is a view illustrating a configuration to display a history of accessed websites on a particular information area of the 3D GUI according to an embodiment of the present invention.

FIG. 32 is a view illustrating a configuration to display a history of accessed websites on a particular information area of the 3D GUI according to an embodiment of the present disclosure.

The controller 180 may allocate and display a plurality of information that can be arranged into a sequence for at least some multiple areas among the first to fifth areas 911, 912, 913, 914 and 915. For example, the controller 180 may access a plurality of websites via a web browser and control the display 151 to display the allocated information in the fifth area 915.

In one example, the mobile terminal 100 may be connected to a website over the network. The fifth area 915 may correspond to a function for controlling the connection between the mobile terminal 100 and the website. The controller 180 may control the display 151 to display a currently-accessed webpage 3260 of the website via the fifth area 915, a previously-accessed webpage 3261 in the third area 913, and a next accessible webpage 3262 in the fourth area 914.

As described above with reference to the stroke signal of FIGS. 27 and 28, the currently-accessed webpage 3260, the previously-accessed webpage 3261, and the next accessible webpage 3262 can be scrolled across the information areas (e.g., areas 913 to 915) according to the stroke operation of the user.

Figure 33:
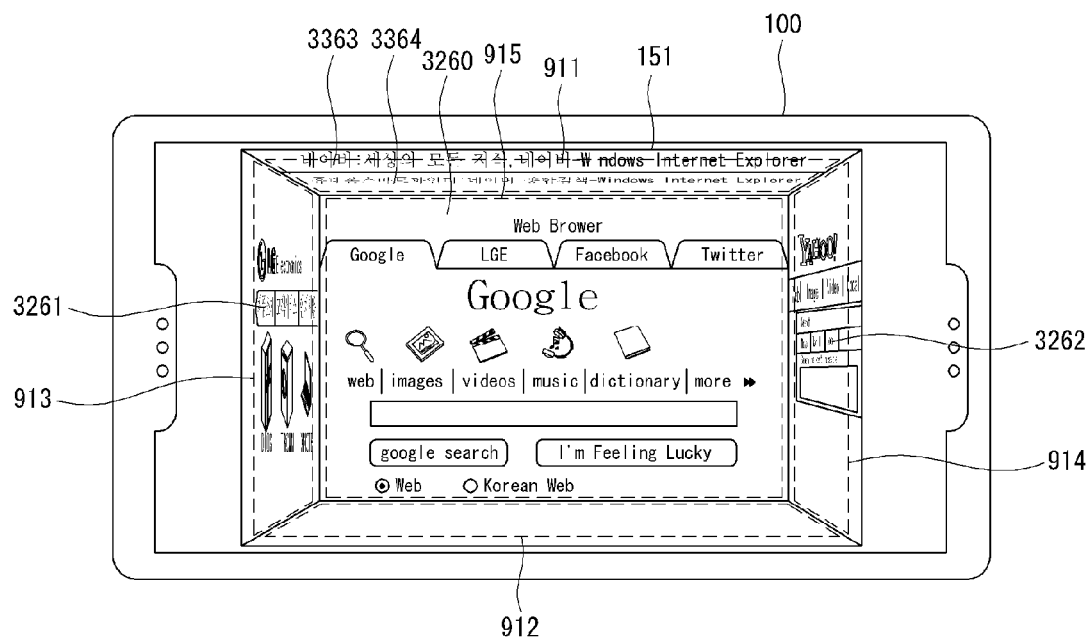
FIG. 33 is a view illustrating a configuration to display information related to a plurality of web browsers on a plurality of information areas of the 3D GUI according to an embodiment of the present invention.

FIG. 33 is a view illustrating a configuration to display information related to a plurality of web browsers on a plurality of information areas of the 3D GUI according to an embodiment of the present disclosure.

Referring to FIG. 33, if more than one web browser is accessed where the web browser 3260 is being displayed in the fifth area 915, the additionally-accessed web browser may be displayed in another information area of the 3D GUI. For example, the controller 180 may control the display 151 to display information 3363 and 3364 about at least one other accessed web browser in the first area 911 while the web browser 3260 is displayed in the fifth area 915.

When the user sends a touch signal directed to particular information among the information 3363 and 3364 about the at least one other web browser displayed in the first area 911, the web browser corresponding to the touched information is then displayed in the fifth area 915. As a result, the web browser 3260, which was originally displayed in the fifth area 915, switches places with the particular information and can be displayed in the first area 911.

Figure 34:
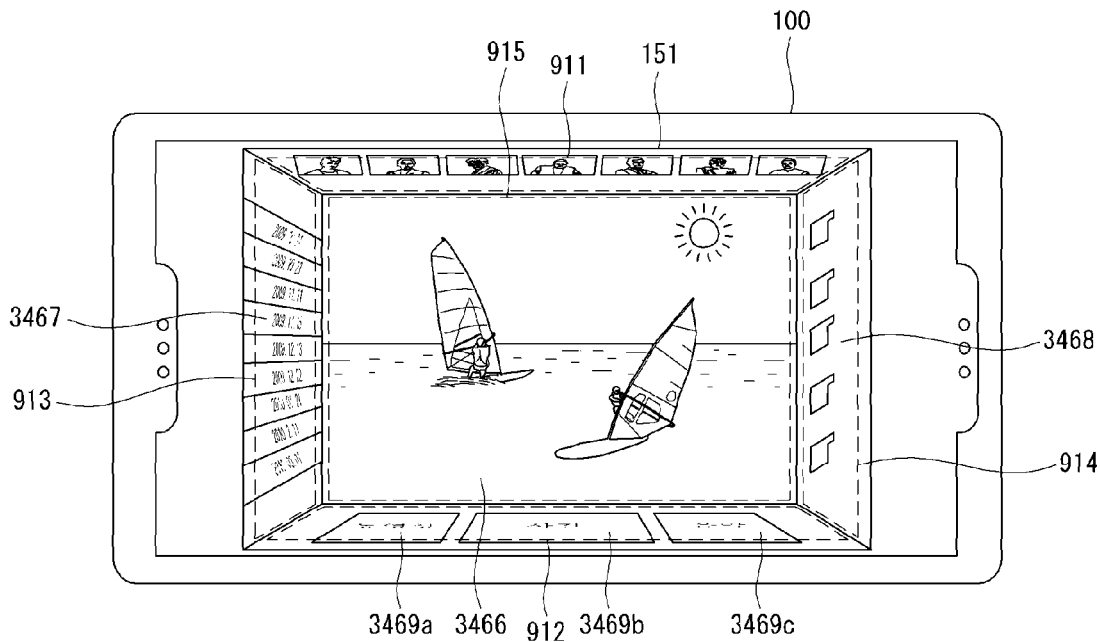
FIG. 34 is a view illustrating a configuration to display information related to multimedia content on a plurality of information areas of the 3D GUI according to an embodiment of the present invention.

FIG. 34 is a view illustrating the 3D GUI in a configuration to display information related to multimedia content on a plurality of information areas of the 3D GUI according to an embodiment of the present disclosure.

Referring to FIG. 34, the controller 180 may control the display 151 to display a video icon 3469a, a photo icon 3469b, and a music icon 3469c in the second area 912.

The user can access multimedia content of a desired type by selecting a particular icon among the icons provided in the second area 912. For example, when a user selects the photo icon 3469b, the controller 180 can provide various kinds of information related to photos in any of the remaining information areas (e.g., first area 911, the third area 913, the fourth area 914, and the center area 915).

For example, the first area 911 may be configured to display thumbnail photos pertaining to a particular group. In another example, the fifth area 915 may be configured to display a currently selected photo.

Groups of photos into which the photos are classified according to a particular standard may be allocated to the third area 913 and the fourth area 914. For example, photo groups by date may be displayed in the third area 913, while photo groups by folder may be displayed in the fourth area 914.

Figure 35:
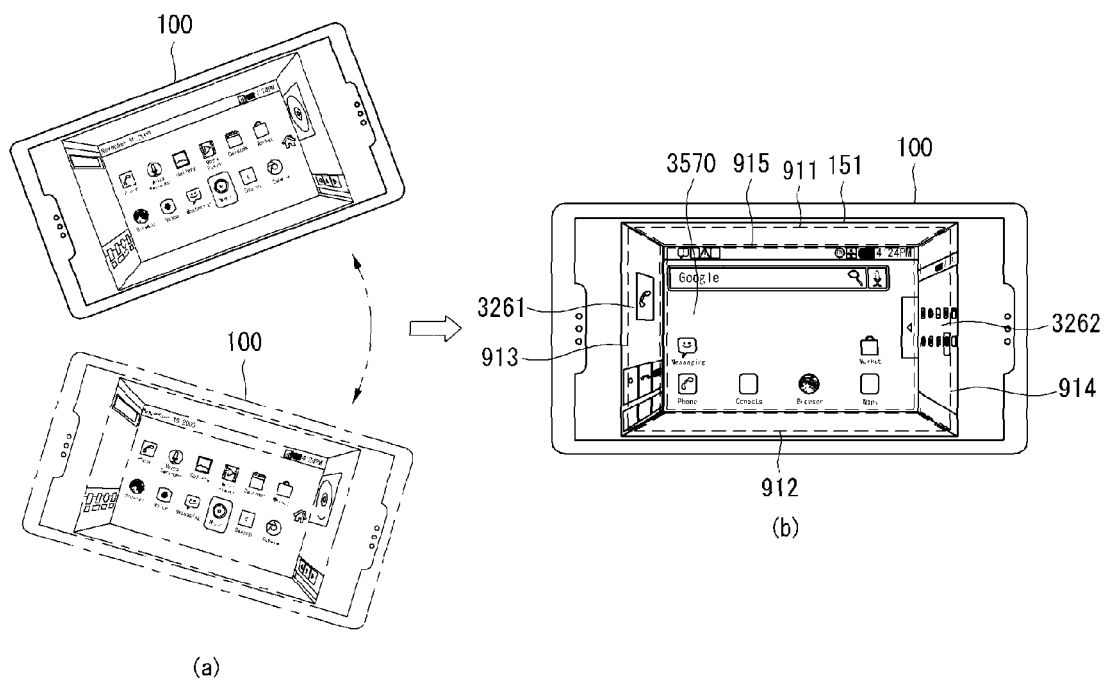
FIG. 35 is an animated view illustrating a function of changing the content in an information area in response to a user input according to an embodiment of the present invention.

FIG. 35 is an animated view illustrating a function of changing the content in an information area in response to a user input according to an embodiment of the present disclosure.

Referring to FIG. 35(a), the mobile terminal 100 may be configured to sense movement in order to change a mode of at least one of the information areas (e.g., first to fifth areas 911 to 915). For example, a user may move or shake the mobile terminal 100, which causes the controller 180 to control the display 151 to change the fifth area 915 from content 3262 to content 3570.

In one example, the controller 180 may change the display 151 to display a standby screen (or a home screen). In another example, the controller 180 may change the display 151 to display a screen set by the user or another multitasking application.

FIGS. 36 to 39 are views illustrating a function of transferring information from a first information area to a second information area of the 3D GUI according to an embodiment of the present disclosure.

Figure 36:
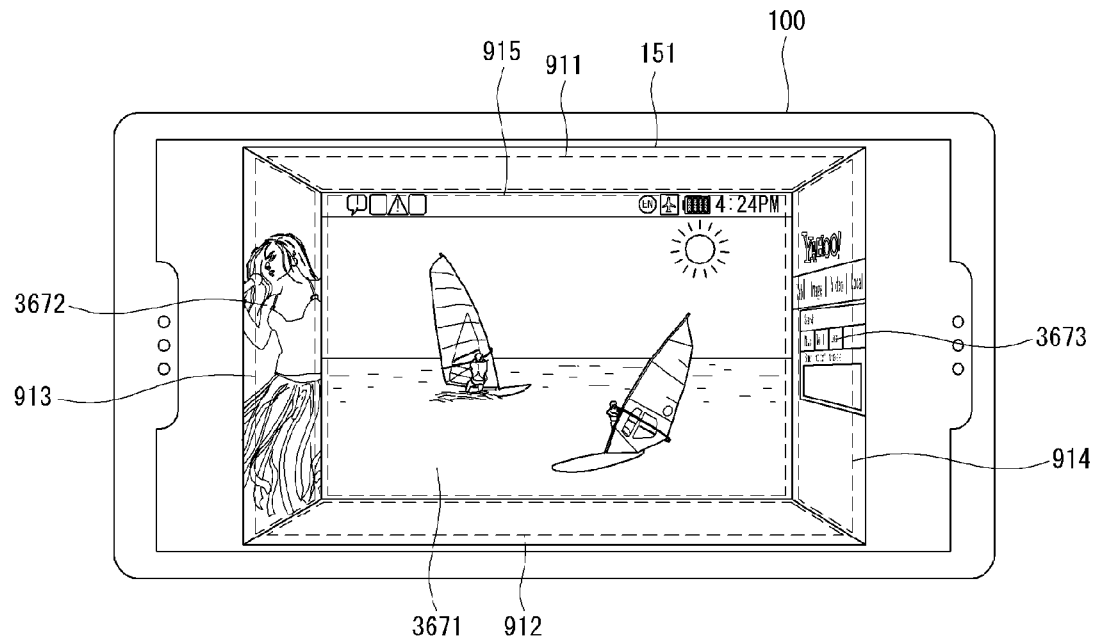
FIGS. 36 to 39 are views illustrating a function of transferring information from a first information area to a second information area of the 3D GUI according to an embodiment of the present invention.

Referring to FIG. 36, the external electronic device 10c can be configured to correspond to the third area 913, and the external electronic device 10b can be configured to correspond to the fourth area 914, for example.

In one example, the third area 913 can display content 3672 that is being output to the external electronic device 10c or an application being run thereon. In another example, the fourth area 914 can display content 3673 being output to the external electronic device 10b or an application being run thereon.

Figure 37:
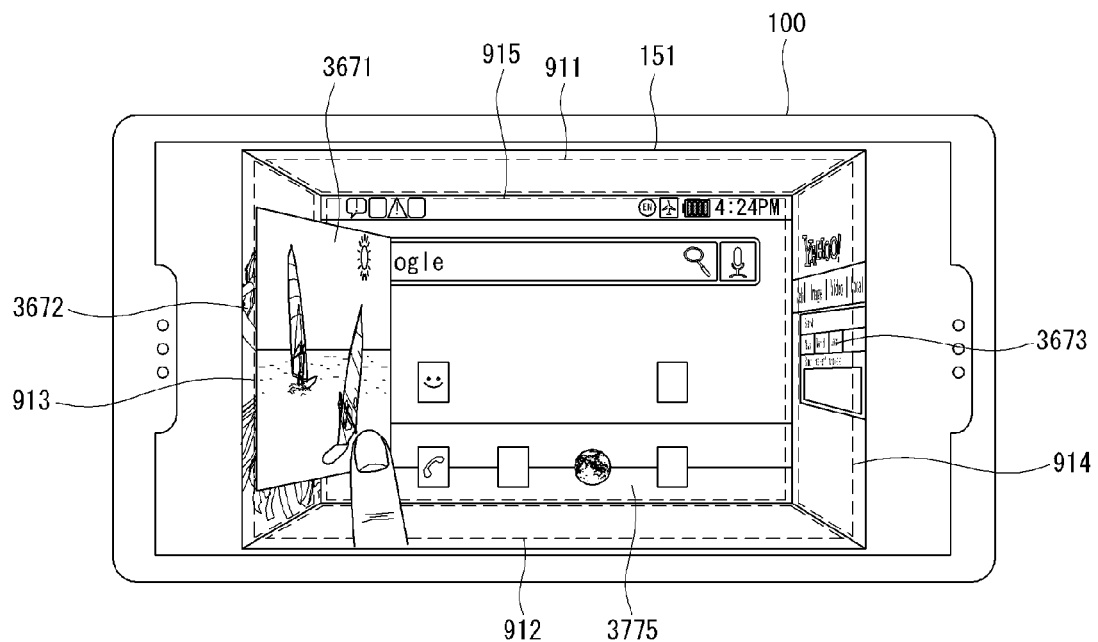

Referring to FIG. 37, the user can drag with their finger, content 3671 being displayed in the fifth area 915 and drop it in the third area 913.

The controller 180 can transmit a control signal for outputting the content 3671 to the external electronic device 10c through the wireless communication unit 110. In some embodiments, if the content 3671 is stored in the memory 160, then the controller 180 can transmit the content 3671 to the external electronic device 10c.

Moreover, the controller 180 may generate information (e.g., broadcast channel information or an internet address of a web server) about an external source providing the content 3671 to the external electronic device 10c.

In view of FIG. 3, the mobile terminal 100 can serve as the DMS 310 and the DMC 340 in the DLNA network 300. The external electronic device 10c may correspond to the DMR 330.

Figure 38:
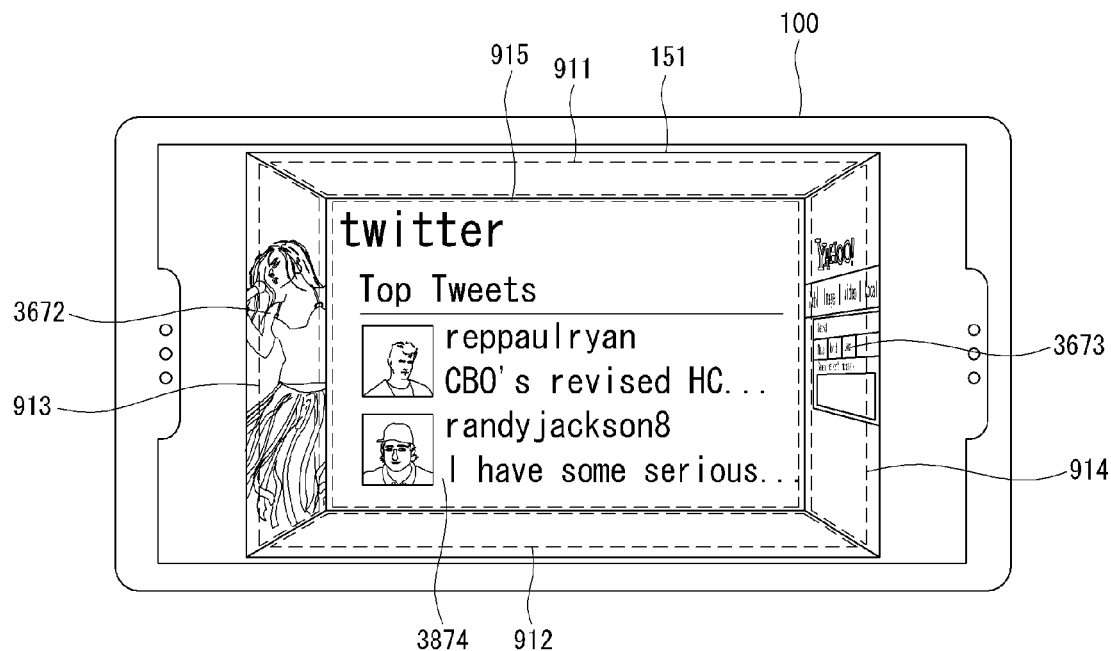

Referring to FIG. 38, a web browser can be displayed in the fifth area 915 of the mobile terminal 100, providing a webpage 3874 from a website. In some examples, the mobile terminal 100 may be connected to the external electronic device 10b that is accessing the website.

Figure 39:
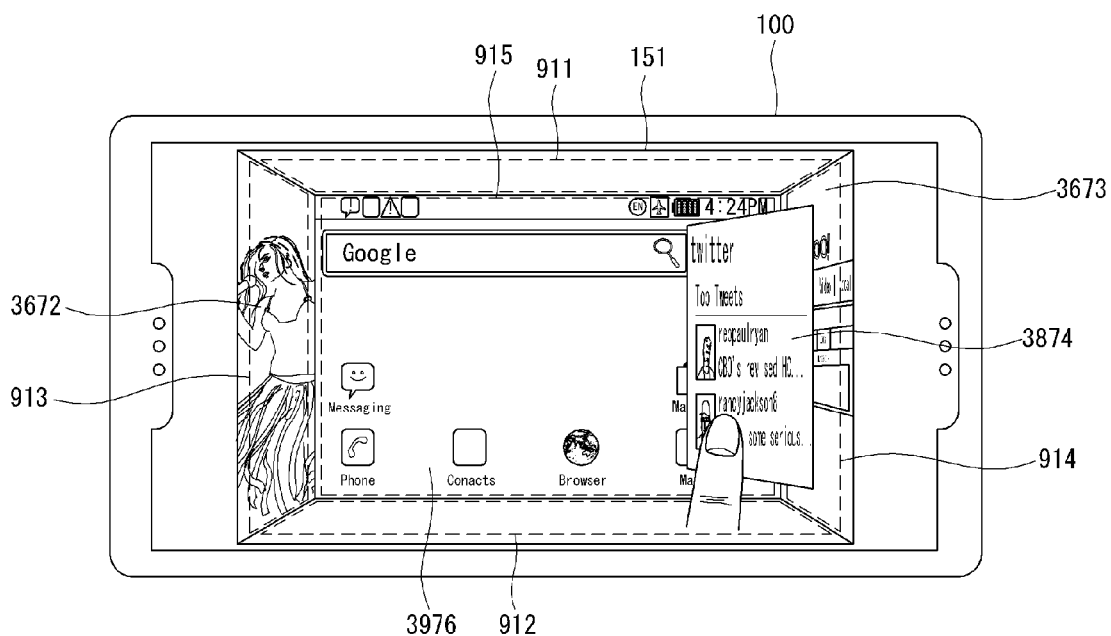

Referring to FIG. 39, the user can drag and drop with their finger, the webpage 3874 from the fifth area 915 to the fourth area 914.

In some examples, the external electronic device 10b may correspond to the fourth area 914. When the webpage 3874 is dragged and dropped from the fifth area 915 to the fourth area 914, the controller 180 may transmit the webpage 3874 or information about the website providing the webpage 3874 to the external electronic device 10b so the webpage 3874 can be displayed on the external electronic device 10b.

The exemplary embodiments described with reference to FIGS. 36 and 39 relate to a single touch method in which the user can drag and drop particular data with their finger.

The technical spirit of this disclosure may encompass information transfer and control using several touch methods, including but not limited to, a multi-touch method, a long-touch method, or a single-touch method.

When any one of the single-touch method, the multi-touch method, and the long-touch method is applied, different data may be transferred from the mobile terminal 100 to an external electronic device on the network.

For example, the single-touch method may be used to move or duplicate a particular object, such as a particular icon or a particular application, rather than selecting data displayed entirely in the fifth area 915 to be sent to another electronic device on the network.

Figure 40:
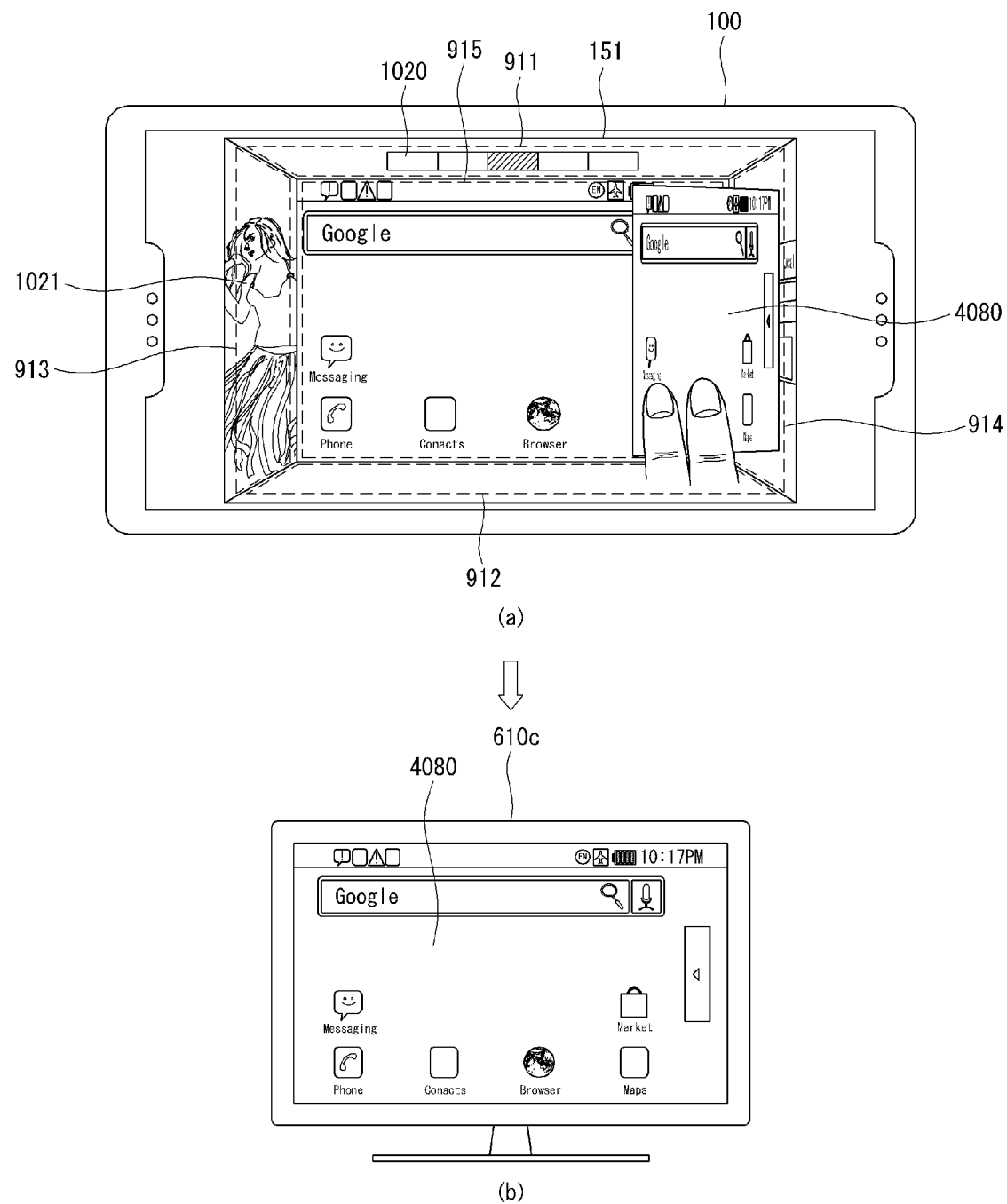
FIG. 40 is an animated view illustrating a multi-touch method for transmitting data from a first electronic device to a second electronic device according to an embodiment of the present invention.

FIG. 40 is an animated view illustrating a multi-touch method for transmitting content 4080 from a first electronic device to a second electronic device according to an embodiment of the present disclosure. For ease of explanation, the discussion of the first electronic device will be directed to the mobile terminal 100. However, the first electronic device may be directed to any one of the electronic devices on the network (e.g., external electronic devices 10*a* to 10*c*)

In one embodiment, the multi-touch method may be used to move content 4080 displayed entirely in the fifth area 915 to the second electronic device. In another embodiment, the long-touch method (i.e., touching or pressing a certain point on the display 151 and dragging the point thereafter) may be used to duplicate the content 4080 displayed entirely in the fifth area 915 to be sent to the second electronic device on the network.

Movement and duplication of data may be distinguishable from each other. When data is duplicated and sent to another electronic device, the fifth area 915 and the other electronic device can display the same data. In contrast, when data is moved to another electronic device, the data no longer exists in the mobile terminal 100 and may only be displayed on the other electronic device.

In some embodiments, the above-described method of controlling an electronic device according to the present disclosure may be recorded in a computer-readable recording media as a program for being executed in computers.

In other embodiments, the method of controlling an electronic device according to the present disclosure may be executed through software. When the method is executed through the software, the constituting means of the present disclosure are code segments executing a necessary task. Programs or code segments may be stored in processor-readable media or transmitted through computer data signals combined with carriers over transmission media or a communication network.

Computer-readable recording media can include all kinds of recording devices in which data capable of being read by a computer system is stored. For example, the computer-readable recording media may include at least Read-Only Memory (ROM), Random-Access Memory (RAM), Compact-Disc ROM (CD-ROM), Digital Versatile Disc ROM (DVD-ROM), DVD-RAM, magnetic tapes, floppy disks, hard disks, or optical data storage. The computer-readable recording media may also be stored and executed as programmable code, which can be distributed by computer systems connected over a network and readable by computers in a distributed manner.

The present disclosure described above is not limited to the aforementioned exemplary embodiments and the accompanying drawings. It will be apparent that those skilled in the art can make various substitutions, modifications and changes thereto without departing from the technical spirit of the present disclosure. Further, the exemplary embodiments described in this disclosure are not limited to the features described herein, and all or some of the embodiments may be selectively combined so that they can be modified in various manners.

What is claimed is:

1. A method of controlling an electronic device, the method comprising:
   receiving first and second touch inputs relative to a display of the electronic device;
   displaying a three-dimensional (3D) graphical user interface (GUI) on the display;
   activating and enlarging the displayed 3D GUI responsive to receiving both the first and second touch inputs within a defined time period;
   receiving a stroke input proximate to the enlarged 3D GUI;
   rotating the enlarged 3D GUI in a direction that corresponds to a direction of the stroke input;
   establishing a connection between the electronic device and at least one external electronic device in a Digital Living Network Alliance (DLNA) network;
   identifying a connection state relating to the established connection; and
   changing the displayed 3D GUI for executing a control operation in the at least one external electronic device according to the identified connection state.

2. An electronic device, comprising:
   a display unit displaying information;
   a communication unit communicating with a plurality of external electronic devices in a network; and
   a processor:
   receiving first and second touch inputs relative to the display unit;
   causing the display unit to display a three-dimensional (3D) graphical user interface (GUI);
   activating and enlarging the displayed 3D GUI responsive to receiving both the first and second touch inputs within a defined time period;
   receiving a stroke input proximate to the enlarged 3D GUI;
   rotating the enlarged 3D GUI in a direction that corresponds to a direction of the stroke input;
   establishing a connection between the electronic device and at least one of the plurality of external electronic devices in a Digital Living Network Alliance (DLNA) network;
   identifying a connection state relating to the established connection; and
   changing the displayed 3D GUI for executing a control operation in the at least one of the plurality of external electronic devices according to the identified connection state.

3. The electronic device claim 2, wherein the processor further establishes a correspondence between a plurality of areas of the 3D GUI and the at least one of the plurality of external electronic devices.

4. The electronic device of claim 3, wherein the processor further:
   receives information about content or applications from the at least one of the plurality of external electronic devices; and
   causes the display unit to display the received information in a corresponding at least one of the plurality of areas.

5. The electronic device of claim 3, wherein the processor further:

receives information about multiple content or applications from the at least one of the plurality of external electronic devices;
groups the received information; and
causes the display unit to display the grouped information in a corresponding at least one of the plurality of areas.

6. The electronic device claim 2, wherein the processor further:
divides an area of the display unit into a plurality of separated areas;
establishes a correspondence between each of the plurality of separated areas and one of the plurality of external electronic devices; and
causes the display unit to display information related to a specific one of the plurality of external electronic devices on a corresponding one of the plurality of separated areas.

7. The electronic device of claim 2, wherein the processor further:
selects a first area of the 3D GUI corresponding to a first external electronic device of the plurality of external electronic devices responsive to receiving user contact with the display proximate to the first area; and
switches settings between the selected first area and a second area of the 3D GUI responsive to receiving a drag input that extends from the selected first area toward the second area,
wherein switching the settings comprises:
changing a setting of the first external electronic device to change a correspondence from the selected first area to the second area; and
changing a setting of a second external electronic device of the plurality of external electronic devices that corresponds to the second area to change a correspondence from the second area to the selected first area.

8. The electronic device claim 2, wherein the processor further sends a command to a specific electronic device of the plurality of external electronic devices for executing a specific operation according to the connection state of the specific electronic device responsive to receiving user contact with a corresponding one of a plurality of areas of the 3D GUI.

9. The electronic device of claim 2, wherein the processor further executes a specific application of a plurality of applications associated with one of the plurality of external electronic devices when the controller determines that a number of multitasking applications being performed by the one of the plurality of external electronic devices is greater than a threshold value.

10. The electronic device of claim 9, wherein the processor further determines the one of the plurality of external electronic devices according to a type of the specific application.

* * * * *